United States Patent
Kaneiwa et al.

(10) Patent No.: US 8,394,487 B2
(45) Date of Patent: Mar. 12, 2013

(54) BIREFRINGENT PATTERN BUILDER AND LAMINATED STRUCTURE MATERIAL FOR PREVENTING FORGERY

(75) Inventors: Hideki Kaneiwa, Minami-ashigara-shi (JP); Ichiro Amimori, Minami-ashigara-shi (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 677 days.

(21) Appl. No.: 12/469,194

(22) Filed: May 20, 2009

(65) Prior Publication Data

US 2009/0291272 A1 Nov. 26, 2009

(30) Foreign Application Priority Data

May 21, 2008 (JP) ................................ 2008-132958
Jun. 17, 2008 (JP) ................................ 2008-157696

(51) Int. Cl.
*B32B 3/10* (2006.01)
(52) U.S. Cl. .................... 428/195.1; 428/203; 428/916; 430/20; 359/489.01
(58) Field of Classification Search .................. 428/203, 428/195.1, 916; 430/20; 359/489.01
See application file for complete search history.

(56) References Cited

U.S. PATENT DOCUMENTS

| | | | |
|---|---|---|---|
| 7,244,798 B2 * | 7/2007 | Matsumoto et al. | 526/319 |
| 2005/0101752 A1 * | 5/2005 | Matsumoto et al. | 526/319 |
| 2006/0193998 A1 | 8/2006 | Harding et al. | |
| 2007/0164255 A1 | 7/2007 | Seki et al. | |
| 2008/0055521 A1 | 3/2008 | Mizutani et al. | |
| 2008/0143926 A1 * | 6/2008 | Amimori et al. | 349/75 |
| 2009/0174857 A1 | 7/2009 | Amimori et al. | |
| 2009/0252898 A1 | 10/2009 | Tomita et al. | |

FOREIGN PATENT DOCUMENTS

| | | |
|---|---|---|
| EP | 1748306 A1 | 1/2007 |
| EP | 1900509 A1 | 3/2008 |
| EP | 1925954 A2 | 5/2008 |
| GB | 2394718 A | 5/2004 |
| JP | 3-141320 A | 6/1991 |
| JP | 8-095491 A | 4/1996 |
| JP | 9-244519 A | 9/1997 |
| JP | 2004-123882 A | 4/2004 |
| JP | 2006-104307 A | 4/2006 |
| JP | 2006-526165 A | 11/2006 |
| JP | 2007-001130 A | 1/2007 |
| JP | 2007-121986 A | 5/2007 |

(Continued)

OTHER PUBLICATIONS

Official Action issued in corresponding Japanese Patent Application No. 2008-132958, May 22, 2012, 3 pages, Japanese Patent Office, JP; and excerpted English-language translation thereof (4 pages).

*Primary Examiner* — Gerard Higgins
*Assistant Examiner* — Christopher Polley
(74) *Attorney, Agent, or Firm* — Buchanan Ingersoll & Rooney PC

(57) ABSTRACT

A birefringent pattern builder, having an optically anisotropic layer containing a polymer having unreacted reactive groups, wherein the optically anisotropic layer is produced by a method containing the steps [1] and [2] in this order:

[1] coating and drying a solution containing a liquid crystalline compound having at least two kinds of reactive groups; and

[2] reacting one kind of the at least two kinds of reactive groups by applying heat or irradiating ionizing radiation.

8 Claims, 8 Drawing Sheets

FOREIGN PATENT DOCUMENTS

| | | |
|---|---|---|
| JP | 2007-199661 A | 8/2007 |
| JP | 2007-230968 A | 9/2007 |
| JP | 2008-052078 A | 3/2008 |
| WO | WO 2004/090025 A1 | 10/2004 |

* cited by examiner

After peeling off
→

After peeling off
→

After peeling off
→

After re-adhering
→

BIREFRINGENT PATTERN BUILDER AND LAMINATED STRUCTURE MATERIAL FOR PREVENTING FORGERY

FIELD OF THE INVENTION

The present invention relates to a birefringent pattern builder and a product obtained by using the same. In particular, the present invention relates to a laminated structure material for preventing forgery.

BACKGROUND OF THE INVENTION

A birefringent pattern in which regions having different birefringence are arranged in a patterned manner is used for an optical compensation film of a liquid crystal display device, an authentication image for preventing forgery, an optical element, or the like. The birefringent pattern has been conventionally produced by subjecting a birefringent pattern builder to heating or exposure in a patterned manner.

As the birefringent pattern builder, a polymerizable liquid crystal material containing a photoisomerizable compound is disclosed in JP-T-2006-526165 ("JP-T" means a published Japanese translation of PCT international application). By partially isomerizing this material, and subsequently polymerizing and fixing the material, a birefringent pattern is produced.

United Kingdom Patent No. 2394718A discloses a method of producing a phase difference pattern by curing a polymerizable liquid crystal material based on different conditions depending on the respective regions. JP-A-3-141320 ("JP-A" means unexamined published Japanese patent application) discloses a birefringent pattern produced by a thermoplastic/photodegradable phase difference material.

In the conventionally-known method as described above, the materials are in a monomer form, and they are not in a film form until the birefringent pattern is produced. Thus, it is difficult to handle these materials. Furthermore, the materials once formed in a film-like shape have therein a fixed birefringent pattern. Therefore, it is impossible to use the materials as a material for producing a birefringent pattern.

A seal displaying an image for which the imitation is difficult is helpful, by being adhered on a product, for preventing forgery of the product. However, the seal form may cause a case where the seal is used for a fake product.

As a technique for preventing the seal from being used for a fake product, JP-A-8-95491 discloses a brittle seal containing a partially-formed delamination layer. According to this technique, on a functional layer obtained by laminating a plurality of ceramic materials having different refractive indexes for determining the authenticity, a partially-formed delamination layer is provided at which a part of the functional layer can be peeled. Once the seal is peeled, a display that is visualized based on a difference in the optical property between the part at which the seal is already peeled off and the residual left on the adhering base functions as an indicating sign for preventing the seal from being used for a fake product. However, the laminated structure material having different refractive indexes does not have a latent image that can be clearly determined by a polarizing plate or the like and thus is not optimal for the judgment of the authenticity.

JP-A-9-244519 discloses a technique regarding a seal having a hologram provided on a base material that is used to conduct an authenticity judgment. This seal is structured so that a surface having regions different in adhesive between the base material and a hologram-forming layer is provided by subjecting the base material to a processing (e.g., corona processing). Specifically, due to the difference in the adherence property between the processed part and the not-processed part, the seal is broken when the seal is peeled. However, with the spread of techniques, the production of holograms has been easier, resulting in a current situation where more visual holograms are produced that cannot be distinguished from the authentic ones.

A birefringent pattern through which a latent image is visualized by a polarizing plate is one of techniques suggested to be used as an authentication image for distinguishing the false one from the true one (JP-A-2007-1130). However, no seal has been known that can be used for the authenticity judgment, that has a birefringent pattern having a high resolution and a high heat resistance, and that has a birefringent pattern prevented from being used for a fake product.

SUMMARY OF THE INVENTION

The present invention resides in a birefringent pattern builder, comprising an optically anisotropic layer containing a polymer having unreacted reactive groups, wherein the optically anisotropic layer is produced by a method comprising at least steps [1] and [2] in this order:

[1] coating and drying a solution containing a liquid crystalline compound having at least two kinds of reactive groups; and

[2] reacting one kind of the at least two kinds of reactive groups by applying heat or irradiating ionizing radiation.

Further, the present invention resides in a method of producing a patterned birefringent product, comprising at least steps [11] and [12] in this order:

[11] subjecting the above-described birefringent pattern builder to a heat treatment or irradiation of ionizing radiation in a patterned manner; and

[12] causing the unreacted reactive groups remaining in the optically anisotropic layer to react or deactivate.

Further, the present invention resides in a method of producing a patterned birefringent product, comprising at least steps [21] to [24] in this order:

[21] coating and drying a solution containing a liquid crystalline compound having at least two kinds of reactive groups;

[22] causing one of the at least two kinds of reactive groups to react by applying heat treatment or irradiating of ionizing radiation, while the liquid crystalline compound being aligned or oriented;

[23] causing the other reactive group than the reactive group reacted in the above step [22] to react by applying heat treatment or irradiating ionizing radiation; and

[24] baking the resultant at from 50° C. to 400° C.;
wherein the heat treatment or irradiation of ionizing radiation it the above step [22] and/or the above step [23] is performed in a patterned manner.

Further, the present invention resides in a product used as a means of preventing forgery, which is obtainable from any one of the above-described methods.

Furthermore, the present invention resides in a laminated structure material, comprising an optical stress-sensitive layer, and a patterned optically anisotropic layer containing regions different in birefringence in a patterned manner.

Other and further features and advantages of the invention will appear more fully from the following description, appropriately referring to the accompanying drawings.

DETAILED DESCRIPTION OF THE INVENTION

Figure 1:
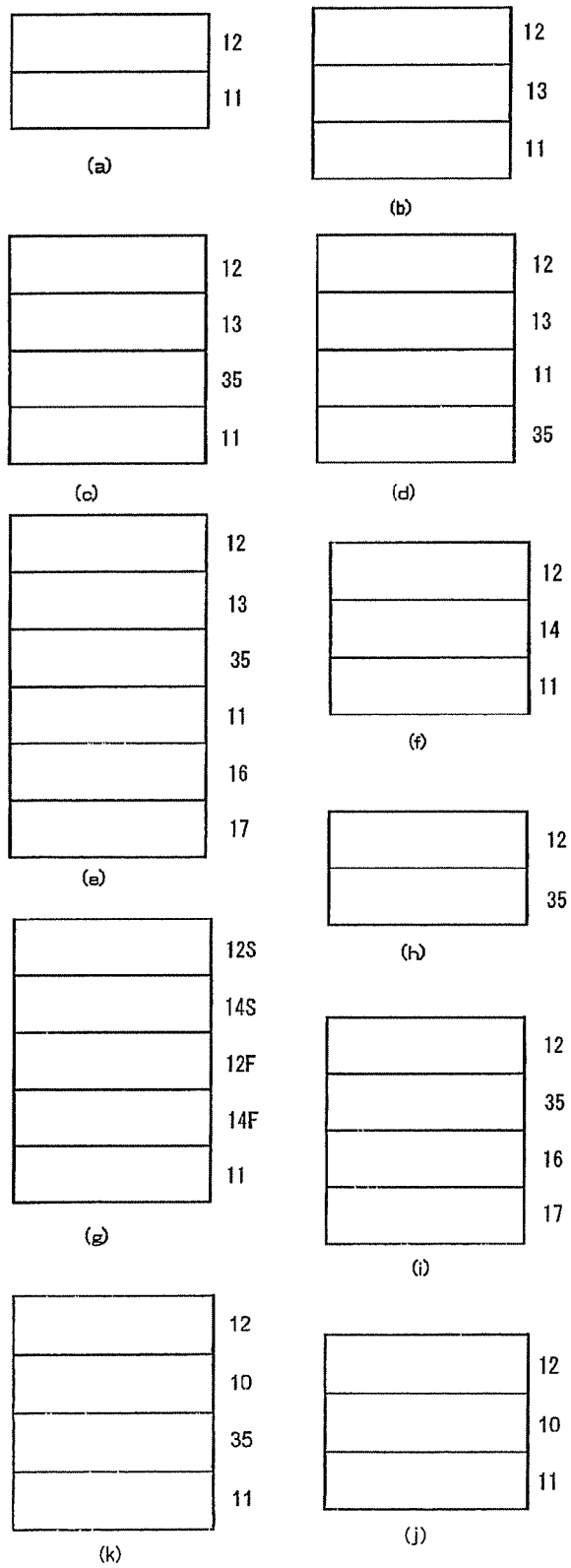
FIGS. 1(a) to 1(k) are a schematic sectional view showing an example of the birefringent pattern builder.

According to the present invention, there are provided the following means:

(1-1) A birefringent pattern builder, comprising an optically anisotropic layer containing a polymer having unreacted reactive groups,
wherein the optically anisotropic layer is produced by a method comprising at least steps [1] and [2] in this order:
[1] coating and drying a solution containing a liquid crystalline compound having at least two kinds of reactive groups; and
[2] reacting one kind of the at least two kinds of reactive groups by applying heat or irradiating ionizing radiation.

(1-2) The birefringent pattern builder described in the above item (1-1), wherein one of the at least two kinds of reactive groups is a radically reactive group and the other is a cationically reactive group.

(1-3) The birefringent pattern builder described in the above item (1-2), wherein the radically reactive group is an acryl group and/or a methacryl group, and the cationically reactive group is a vinyl ether group, an oxetanyl group, and/or an epoxy group.

(1-4) The birefringent pattern builder described in the above item (1-2) or (1-3), wherein the solution containing a liquid crystalline compound contains only a radical polymerization initiator or a cationic polymerization initiator as a polymerization initiator.

(1-5) The birefringent pattern builder described in any one of the above items (1-1) to (1-4), wherein the polymer comprises a unit represented by formula (101) or (102):

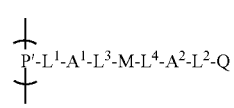

Formula (101)

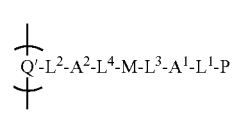

Formula (102)

wherein P represents an unreacted reactive group represented by any one of formulae (3-1) to (3-3):

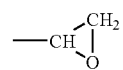

Formula (3-1)

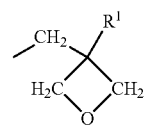

Formula (3-2)

Formula (3-3)

(wherein $R^1$ represents an alkyl group having 1 to 4 carbon atoms);

P' represents a partial substructure represented by any one of formulae (4-1) to (4-3):

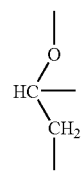

Formula (4-1)

-continued

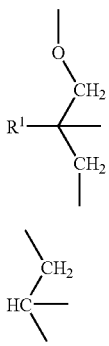

Formula (4-2)

Formula (4-3)

(wherein $R^1$ represents an alkyl group having 1 to 4 carbon atoms);

Q represents an unreacted reactive group represented by formula (5-1) or (5-2);

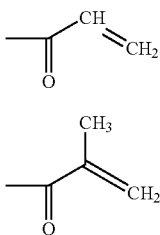

Formula (5-1)

Formula (5-2)

Q' represents a partial substructure represented by formula (6-1) or (6-2);

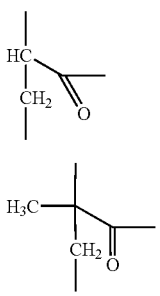

Formula (6-1)

Formula (6-2)

$L^1$, $L^2$, $L^3$, and $L^4$ each independently represent a single bond or a divalent linking group;

$A^1$ and $A^2$ each independently represent a spacer group having 2 to 20 carbon atoms; and M represents a mesogen group.

(1-6) The birefringent pattern builder described in the above item (1-5), wherein $L^1$ is —O—.

(1-7) The birefringent pattern builder described in any one of the above items (1-1) to (1-6), comprising a functional layer containing at least one kind of polymerization initiator for starting a polymerization reaction of the unreacted reactive groups provided on the optically anisotropic layer.

(1-8) The birefringent pattern builder described in the above item (1-7), wherein the birefringent pattern builder is used as a transferring material, and wherein the functional layer is an adhesive layer for transfer.

(1-9) A method of producing a patterned birefringent product, comprising at least steps [11] and [12] in this order:

[11] subjecting the birefringent pattern builder described in any one of the above items (1-1) to (1-8) to a heat treatment or irradiation of ionizing radiation in a patterned manner; and

[12] causing the unreacted reactive groups remaining in the optically anisotropic layer to react or deactivate.

(1-10) A method of producing a patterned birefringent product, comprising at least steps [21] to [24] in this order:

[21] coating and drying a solution containing a liquid crystalline compound having at least two kinds of reactive groups;

[22] causing one of the at least two kinds of reactive groups to react by applying heat treatment or irradiating of ionizing radiation, while the liquid crystalline compound being aligned or oriented;

[23] causing the other reactive group than the reactive group reacted in the above step [22] to react by applying heat treatment or irradiating ionizing radiation; and

[24] baking the resultant at from 50° C. to 400° C.;

wherein the heat treatment or irradiation of ionizing radiation in the above step [22] and/or the above step [23] is performed in a patterned manner.

(1-11) A product used as a means of preventing forgery, which is obtainable from the method described in the above item (1-9) or (1-10).

(2-1) A laminated structure material, comprising:
an optical stress-sensitive layer, and
a patterned optically anisotropic layer containing regions having birefringence different from each other in a patterned manner.

(2-2) The laminated structure material described in the above item (2-1), further comprising a reflective layer.

(2-3) The laminated structure material described in the above item (2-1) or (2-2), wherein the regions having birefringence different from each other are regions having a retardation different from each other.

(2-4) The laminated structure material described in any one of the above items (2-1) to (2-3), wherein the patterned optically anisotropic layer is produced by a method comprising the steps [31] to [33] in this order:

[31] preparing a birefringent pattern builder comprising an optically anisotropic layer containing a polymer having at least two kinds of unreacted reactive groups;

[32] subjecting the birefringent pattern builder to a heat treatment or irradiation of ionizing radiation in a patterned manner, to react one of the two kinds of unreacted reactive groups; and

[33] reacting or deactivating the other reactive group in the optically anisotropic layer.

(2-5) The laminated structure material described in any one of the above items (2-1) to (2-4), wherein the optical stress-sensitive layer is a layer exhibiting an optical anisotropy by applying stress.

(2-6) The laminated structure material described in any one of the above items (2-1) to (2-5), further comprising an adhesive layer.

(2-7) The laminated structure material described in any one of the above items (2-1) to (2-6), wherein the optical stress-sensitive layer is a patterned adhesive layer having a plurality of regions having an adhesive strength different from each other.

(2-8) The laminated structure material described in any one of the above items (2-1) to (2-7), wherein the optical stress-sensitive layer comprises an adhesive layer and a patterned delamination layer.

(2-9) The laminated structure material described in any one of the above items (2-1) to (2-8), which is used as a seal for preventing forgery.

Hereinafter, a first embodiment of the present invention means to include the birefringent pattern builders as described in the items (1-1) to (1-8) above, the methods of producing a patterned birefringent product as described in the items (1-9) to (1-10) above, and the product as described in the items (1-11) above.

Further, a second embodiment of the present invention means to include the laminated structure materials as described in the items (2-1) to (2-9) above.

Herein, the present invention means to include all of the above first, and second embodiments, unless otherwise specified.

The present invention is described below in detail.

In the present specification, "to" denotes a range including numerical values described before and after it as a minimum value and a maximum value.

In the present specification, the term "laminated structure material" means a structure having a planar or sheet-like shape. In the present invention, the laminated structure material is preferably a structure that can be bonded or adhered to a product by adhesive agent or tackiness agent (removable adhesive agent) in particular. In the present invention, it is also preferred that the laminated structure material itself has an adhesive layer and has an adhesibility. The adhesive layer also may be the one by which the laminated structure material can be adhered to a product.

In the present specification, the term "birefringent pattern" means a pattern having two or more regions different in birefringence. The birefringent pattern generally contains a patterned optically anisotropic layer, i.e., a layer containing two or more regions having birefringence different from each other. The regions different in birefringence may be regions different in retardation and/or optical axis direction from each other. The regions are preferably regions different in retardation from each another. Since the regions are recognized when the birefringent pattern is observed in a normal direction of the laminated structure, the regions may be regions divided by a plane parallel to the normal direction of the plane of the laminated structure.

Herein, in the present specification, the term "retardation" or "Re" means an in-plane retardation, and the term "Re(λ)" indicates an in-plane retardation at wavelength λ (nm). The in-plane retardation (Re(λ)) can be measured by making light of wavelength λ nm incident in the direction of the normal of the film, in KOBRA 21ADH or WR (each trade name, manufactured by Oji Scientific Instruments). In the present specification, retardation or Re means one measured at wavelength λ 611±5 nm for R (Red), 545±5 nm for G (Green), or 435±5 nm for B (Blue), respectively, and denotes one measured at wavelength λ 545±5 nm or 590±5 nm unless otherwise specified any of color.

It is to be noted that, regarding angles, the term "substantially" in the context of this specification means that a tolerance of less than ±5° with respect to the precise angles can be allowed. Difference from the precise angles is preferably less than 4°, and more preferably less than 3°. It is also to be noted that, regarding retardation values, the term "substantially" in the context of the specification means that a tolerance of less than ±5% with respect to the precise values can be allowed. It is also to be noted that the term "The Re value is substantially not zero" in the context of the specification means that the Re value is 5 nm or more. The measurement wavelength for refractive indexes is any visible light wavelength, unless otherwise specified. It is also to be noted that the term "visible light" in the context of the specification means light of a wavelength falling within the range from 400 to 700 nm.

In the present specification, the term "optical stress-sensitive layer" means a layer having a property capable of detecting stress optically. In the laminated structure material of the present invention, the optical stress-sensitive layer is provided as a layer for detecting peeling.

[Birefringent Pattern Builder]

The birefringent pattern builder is a material for preparing birefringence pattern, and a material with which the patterned birefringent product can be prepared by conducting the predetermined steps. The birefringent pattern builder may generally have a planar (or film-like or sheet-like) shape.

FIGS. 1(a) to 1(k) are schematic sectional views showing several examples of the birefringent pattern builder.

The birefringent pattern builder shown in FIG. 1(a) is an example having an optically anisotropic layer 12 on a support (substrate) 11. The birefringent pattern builder shown in FIG. 1(b) is an example further having an alignment layer 13. The alignment layer 13 functions as a layer for supporting the alignment/orientation of liquid crystalline compounds, when use is made, as the optically anisotropic layer 12, of a layer formed by coating a substrate with a solution comprising the liquid crystalline compounds and drying the solution to thereby form a liquid crystal phase, and then polymerizing and fixing the compounds by applying heat or irradiating ionizing radiation to the liquid crystal phase.

The birefringent pattern builder shown in FIG. 1(c) is an example further having a reflective layer 35 on the support 11. The birefringent pattern builder shown in FIG. 1(d) is an example further having the reflective layer 35 under the support 11. The birefringent pattern builder shown in FIG. 1(e) is an example having a post-adhesive layer 16 (which is a layer functions as an adhesive when attached to a subject 'another product' after peeling off the below-mentioned delamination layer from the resultant laminated structure) and a delamination layer 17 (which is a layer that can be delaminated or peeled off from the laminated structure) under the support 11, in order to be attached to another product after forming the birefringence pattern.

The birefringent pattern builder shown in FIG. 1(f) is an example having an adhesive layer 14 for transfer between the support 11 and the optically anisotropic layer 12 as it is prepared by using a transferring material. The birefringent pattern builder shown in FIG. 1(g) is an example having plural optically anisotropic layers (the first optically anisotropic layer 12F and the second optically anisotropic layer 12S) and plural adhesive layers for transfer (the first adhesive layer for transfer 14F and the second adhesive layer for transfer 14S).

The birefringent pattern builder shown in FIG. 1(h) is an example having a reflective layer 35 under a self-supporting optically anisotropic layer 12. The birefringent pattern builder shown in FIG. 1(i) is an example having the post-adhesive layer 16 and the delamination layer 17 under the reflective layer 35 in order to be attached to another product after forming the birefringence pattern.

The birefringent pattern builder shown in FIG. 1(j) is an example having a layer 10 exhibiting an optical anisotropy by applying stress as an optical stress-sensitive layer between the support 11 and the optically anisotropic layer 12. The birefringent pattern builder shown in FIG. 1(k) is an example further having a reflective layer 35 in the example shown in FIG. 1(j).

[Birefringent Pattern Builder to be Used as Transferring Material]

FIGS. 2(a) to 2(g) are schematic sectional views showing several examples of the birefringent pattern builder of the present invention that can be used as a transferring material. By using the birefringent pattern builder as a transferring material, a birefringent pattern builder having an optically anisotropic layer on a desired support, a birefringent pattern builder having plural optically anisotropic layers, or a product having plural layers having birefringence pattern, can be readily formed.

Figure 2:
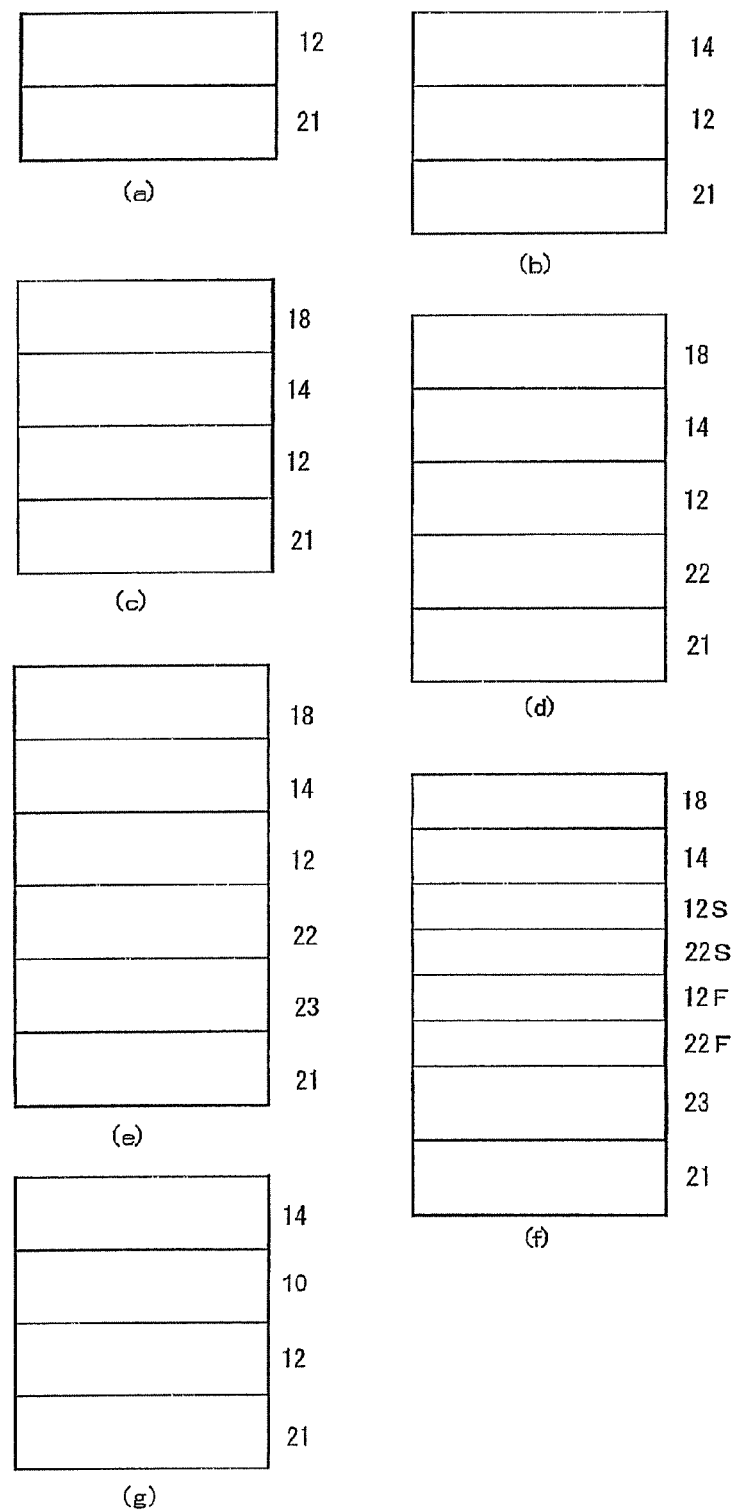
FIGS. 2(a) to 2(g) are a schematic sectional view showing an example of the birefringent pattern builder which are used as a transferring material.

The birefringent pattern builder shown in FIG. 2(a) is an example having an optically anisotropic layer 12 on a temporary support 21. The birefringent pattern builder shown in FIG. 2(b) is an example further having an adhesive layer 14 for transfer on the optically anisotropic layer 12. The birefringent pattern builder shown in FIG. 2(c) is an example further having a surface-protecting layer 18 on the adhesive layer 14 for transfer. The birefringent pattern builder shown in FIG. 2(d) is an example further having an alignment layer 22 on temporary support between the temporary support 21 and the optically anisotropic layer 12. The birefringent pattern builder shown in FIG. 2(e) is an example having further a dynamic-property-controlling layer 23 between the temporary support 21 and the alignment layer 22 on the temporary support. The birefringent pattern builder shown in FIG. 2(f) is an example having plural optically anisotropic layers (the first the optically anisotropic layer 12F and the second the optically anisotropic layer 12S) and plural alignment layers on temporary support (the first alignment layer 22F on temporary support and the second alignment layer 22S on temporary support). The birefringent pattern builder shown in FIG. 2(g) is an example having a layer 10 exhibiting an optical anisotropy by applying stress as an optical stress-sensitive layer.

[Birefringent Pattern]

Figure 3:
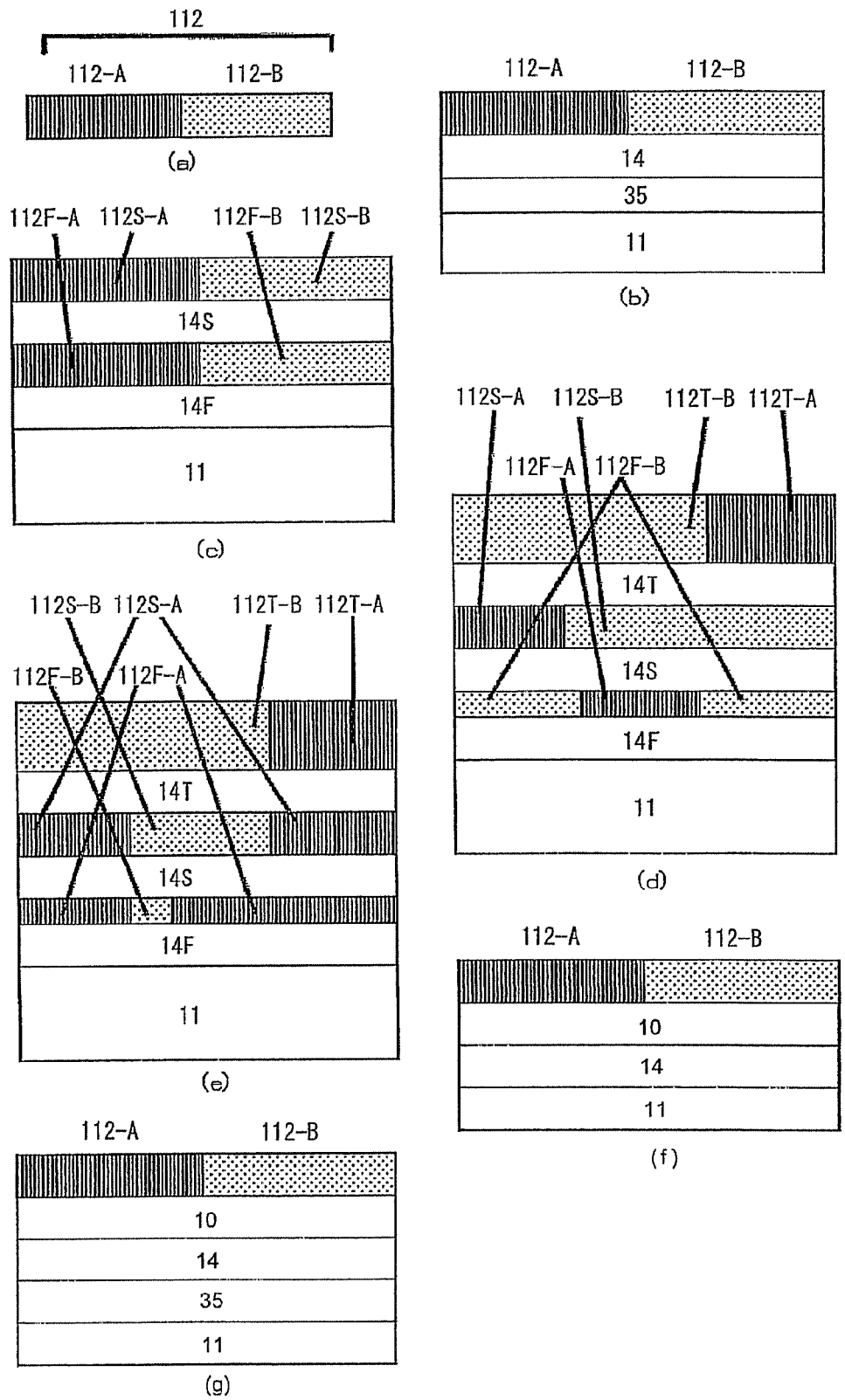
FIGS. 3(a) to 3(g) are a schematic sectional view showing an example of the patterned birefringent product.

FIGS. 3(a) to 3(g) are schematic sectional views showing several examples of the patterned birefringent product which can be obtained by the production method of the present invention using the birefringent pattern builder. The patterned birefringent product obtainable by the method of the present invention has at least one layer of patterned optically anisotropic layer 112. In the present specification, the term "patterned optically anisotropic layer" means "an optically anisotropic layer having regions different in birefringence from each other in a patterned manner". The patterned birefringent product shown in FIG. 3(a) is an example consisting of only one patterned optically anisotropic layer 112. The exposed region (part) 112-A and not-exposed region (part) 112-B are different in birefringence from each other. The different birefringence depending on the respective regions in a patterned optically anisotropic layer may be formed by heating in a patterned manner or the like. The patterned birefringent product shown in FIG. 3(b) is an example having a support 11, and a reflective layer 35, an adhesive layer 14 for transfer, and a patterned optically anisotropic layer 112, each of which is provided on the support in that order from the support. The patterned birefringent product may have a plurality of patterned optically anisotropic layers. The product having a plurality of patterned optically anisotropic layers can provide a further complicated latent image.

The patterned birefringent product shown in FIG. 3(c) is an example in which a plurality of optically anisotropic layers (the first optically anisotropic layer 112F and the second optically anisotropic layer 112S) are laminated and then exposed to light in a patterned manner, to give the same pattern to the exposed part. The exposed regions (112F-A and 112S-A) and not-exposed regions (112F-B and 112S-B) are different in birefringence from each other. Such a product is useful, for example, in producing a pattern containing a region having a large retardation that is not possible with only one optically anisotropic layer.

The birefringent pattern shown in FIG. 3(d) is an example in which a plurality of optically anisotropic layers (the first optically anisotropic layer 112F, the second optically anisotropic layer 112S, and the third optically anisotropic layer 112T) are given with independent patterns from one another. The shown exposed parts 112F-A, 112S-A, and 112T-A and not-exposed parts 112F-B, 112S-B, and 112T-B have different birefringence properties from one another. For example, this example is an example that is useful when it is desired that two or more optically anisotropic layers having different retardations or slow axes from one another are provided and are given with independent patterns, respectively. The independent patterns from one another can be formed, for example, by repeating a plurality of times a step of forming an optically anisotropic layer (including transfer), a step of conducting a processing such as a patterned light exposure or a pattern heating for forming regions having different retardations, and a step of a post processing such as baking in this order.

The birefringent pattern shown in FIG. 3(e) is an example in which the formation of an optically anisotropic layer (including transfer) and the patterned light exposure are alternately repeated for a required number of times and then the formed layers are patterned by a single baking. By the similar method, while minimizing the number of bakings having a high process load, regions having different retardations from one another can be produced in a required number.

FIG. 3(f) and FIG. 3(g) are an example having the layer 10 showing an optical anisotropy when stress is applied thereto as an optical stress-sensitive layer provided to be adjacent to the patterned optically anisotropic layer.

[Laminated Structure Material Having Birefringent Pattern]

Figure 4:
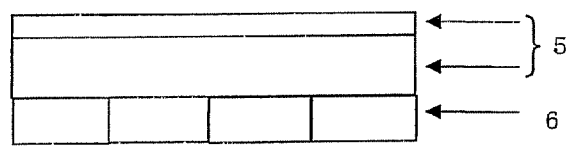
FIG. 4 is a schematic sectional view showing an example of the laminated structure material of the present invention (example of the use of a patterned adhesive layer) before and after peeling this laminated structure material.
Figure 4:
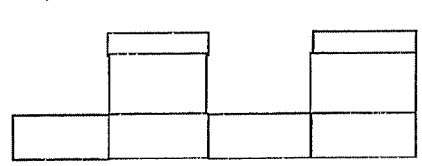
Figure 5:
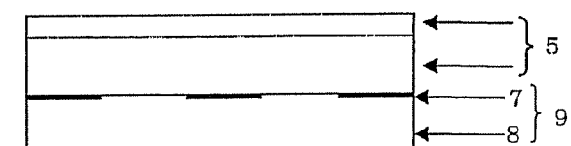
FIG. 5 is a schematic sectional view showing an example of the laminated structure material used as a seal of the present invention (example of the use of a delamination layer and an adhesive layer) before and after peeling this laminated structure material.
Figure 5:
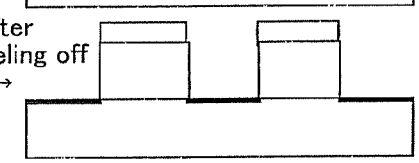
Figure 6:
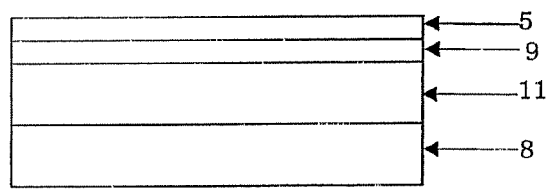
FIG. 6 is a schematic sectional view showing an example of the laminated structure material used as a seal of the present invention (example of the use of a layer exhibiting an optical anisotropy by applying stress) before and after peeling this laminated structure material.
Figure 6:
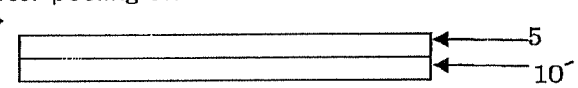
Figure 6:
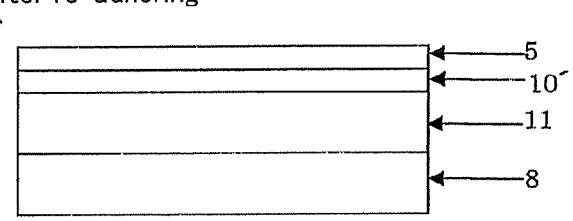

FIGS. 4 to 6 each are a schematic sectional view illustrating an example of the laminated structure material of the present invention. A birefringent pattern 5 may be any of the above birefringent patterns illustrated in FIGS. 3(a) to 3(g) for example.

FIG. 4 is an example in which a patterned adhesive layer 6 having a plurality of regions having different adhesive strengths is provided on the support side of the birefringent pattern as an optical stress-sensitive layer. By adhering the patterned birefringent product to the patterned adhesive layer as described above, the latent image by the birefringent pattern can be caused to deform when the laminated structure material is peeled, thereby making it difficult to reuse the birefringent pattern for another product. Furthermore, by the use of the patterned adhesive layer having a region in which the adhesive strength is higher than a force for breaking the birefringent pattern or the support of the birefringent pattern and a region in which the adhesive strength is lower than the force, the birefringent pattern can be broken when the laminated structure material is peeled.

FIG. 5 is an example in which a layer is used as an optical stress-sensitive layer 9 that includes an adhesive layer 8 and a delamination layer 7 in a part of the surface of the adhesive layer 8. When the laminated structure material is peeled, the birefringent pattern is easily peeled from the adhesive layer only at the delamination layer part. This can consequently cause the latent image by the birefringent pattern to deform, thereby making it difficult to reuse the birefringent pattern for another product. Furthermore, by increasing the adhesive strength of the adhesive layer to be higher than the force required for breaking the birefringent pattern or the support of the birefringent pattern, the birefringent pattern can be broken when the laminated structure material adhered to the product by this adhesive layer is peeled.

FIG. 6 is an example in which a layer exhibiting an optical anisotropy when stress is applied thereto is used as an optical stress-sensitive layer. In FIG. 6, the reference numeral 10' denotes a layer exhibiting an optical anisotropy by applying stress. A layer exhibiting an optical anisotropy by applying stress thereto exhibits an optical anisotropy by a stress caused when the laminated structure material is peeled. Thus, even when the birefringent pattern is used for another product after the laminated structure material bonded or adhered to the product is once peeled, the existence of the layer already exhibiting an optical anisotropy makes it impossible to provide the same latent image as that prior to the peeling. Consequently, the birefringent pattern is prevented from being reused for another product.

[Method of Producing Birefringent Pattern]

The birefringent pattern can be produced, for example, by a method comprising a step of preparing a birefringent pattern builder having an optically anisotropic layer and a step of conducting a processing such as a patterned light exposure or a patterned heating to form regions having retardation different from each other in this order.

Hereinafter, the birefringent pattern builder and the production method of the birefringent pattern will be described in detail. However, the present invention is not limited to this embodiment. Other embodiments also can be carried out with reference to the following description and conventionally-known methods. Thus, the present invention is not limited to the embodiment described below.

[Optically Anisotropic Layer]

The optically anisotropic layer in the birefringent pattern builder is the layer having at least one incident direction, of which retardation (Re) is not substantively zero when a phase difference is measured. In other words, the optically anisotropic layer is the layer having non-isotropic optical characteristic.

The optically anisotropic layer preferably has a retardation disappearance temperature. In the specification, "retardation disappearance temperature" means a temperature at which the retardation of the optically anisotropic layer becomes 30% or lower of the retardation at 20° C. of the same optically anisotropic layer when the temperature of the optically anisotropic layer is increased at the rate of 20° C./minute from the state of 20° C. In the specification, "no retardation disappearance temperature at 250° C. or lower" means that the retardation of the optically anisotropic layer does not become 30% of the retardation at 20° C. of the same optically anisotropic layer when the temperature of the optically anisotropic layer is increased as above until the temperature reaches 250° C.

Because the optically anisotropic layer has the retardation disappearance temperature, a region of a part of an optically anisotropic layer can be caused to disappear by, for example, a patterned heating and thus the birefringent pattern can be formed easily. The retardation disappearance temperature is preferably 20° C. or higher and 250° C. or lower, more preferably 40° C. to 245° C., further preferably 50° C. to 245° C., and most preferably 80° C. to 240° C.

In addition, as the optically anisotropic layer in the birefringence pattern builder, an optically anisotropic layer of which the retardation disappearance temperature rises by light exposure to the birefringence pattern builder is preferably used. By subjecting the birefringent pattern builder to exposure to light (or heating at a temperature equal to or lower than the retardation disappearance temperature), an increase in the retardation disappearance temperature causes a difference in the retardation disappearance temperature between an exposed (or heated) region and an unexposed (or not-heated) region. As a result, by baling the birefringent pattern builder at a temperature higher than the retardation disappearance temperature of the unexposed (or not-heated) region and lower than the retardation disappearance temperature of the exposed (or heated) region, only the retardation of the unexposed (or not-heated) region can be selectively caused to disappear. Thus, a pattern having regions having different birefringence properties can be formed.

The optically anisotropic layer in the birefringence pattern builder preferably contains a polymer. By containing the polymer, the birefringence pattern builder can be deal with as a film and can meet various requirements such as birefringence, transparency, solvent-resistance, toughness, and flexibility.

The polymer in the optically anisotropic layer preferably has an unreacted reactive group. This allows the birefringent pattern builder to maintain the reactivity. The term "unreacted reactive group" means a reactive group and is a concept including an unreacted reactive group left after a polymer is prepared from liquid crystalline compounds as monomer. Since the polymer has an unreacted reactive group, the exposure to light (or heating at a temperature equal to or lower than the retardation disappearance temperature) causes an unreacted reactive group to react to thereby cause the crosslinking of a polymer chain, thus consequently allowing the retardation disappearance temperature to increase easily.

The optically anisotropic layer may be solid at 20° C., preferably at 30° C., and more preferably at 40° C., because an optically anisotropic layer which is solid at 20° C. can readily be applied with another functional layer, or transferred or attached to a support.

In order to be applied with another functional layer, the optically anisotropic layer is preferred to have solvent-resistance. In the specification, "to have solvent-resistance" means that the retardation of the layer after soaked in the subject solvent for two minutes is in the range of 30 to 170%, more preferably 50 to 150%, most preferably 80 to 120%, with respect to the retardation of the layer before the soaking. As the subject solvent, examples include water, methanol, ethanol, isopropanol, acetone, methylethylketone, cyclohexanone, propyleneglycolmonomethyletheracetate, N-methylpyrrolidone, hexane, chloroform, and ethyl acetate. Among them, acetone, methylethylketone, cyclohexanone, propyleneglycolmonomethyletheracetate, and N-methylpyrrolidone are preferable; and methylethylketone, cyclohexanone, and propyleneglycolmonomethyletheracetate, and a mixture thereof are most preferable.

The retardation of the optically anisotropic layer at 20° C. may be 5 nm or more, preferably 10 nm or more and 10,000 nm or less, and more preferably 20 nm or more and 2,000 nm or less. When the retardation is too small, formation of birefringence pattern may become difficult. When the retardation is too large, error becomes larger and it may become difficult to achieve practically needed accuracy.

Although the production method of the optically anisotropic layer is not particularly limited, methods shown below for example may be used.

a) A method of producing an optically anisotropic layer by coating and drying a solution containing a liquid crystalline compound having at least one reactive group to form a liquid crystal phase, and then by polymerizing and fixing the compound by applying heat or irradiating ionizing radiation to the liquid crystal phase.

b) A method of stretching a layer obtained by polymerizing and fixing a monomer having at least two or more reactive groups.

c) A method of introducing a reactive group into a layer made of a polymer by a coupling agent to subsequently stretch the layer.

d) A method of stretching a layer made of a polymer to subsequently introduce a reactive group into the layer by a coupling agent.

Alternatively, the optically anisotropic layer also may be formed by transfer as described later.

[Optically Anisotropic Layer Formed by Polymerizing and Fixing Composition Comprising Liquid Crystalline Compound]

The production method of the optically anisotropic layer is explained below, wherein coating with a solution comprising a liquid crystalline compound having at least one reactive group is conducted and the solution is dried to thereby form a liquid crystal phase, and then the liquid crystal phase is polymerized and fixed by applying heat or irradiating ionizing radiation. This method is preferable, because it is easy to obtain an optically anisotropic layer which is thinner in thickness but has an equal retardation compared with the layer obtainable by the method of forming an optically anisotropic layer by stretching of polymer, which method will be explained later.

An optically anisotropic layer of the birefringent pattern builder of the first embodiment of the present invention is produced by a method comprising the following steps [1] and [2] in this order.

[1] A step of coating and drying a solution containing a liquid crystalline compound having at least two kinds of reactive groups.

[2] A step of reacting one kind of the at least two kinds of reactive groups by applying heat or irradiating ionizing radiation.

The following section will describe a material for forming an optically anisotropic layer and the respective steps.

[Liquid-Crystalline Compound]

The liquid-crystalline compounds can generally be classified by molecular geometry into rod-like one and discotic one. Each category further includes low-molecular type and high-molecular type. The high-molecular type generally refers to that having a degree of polymerization of 100 or above ("Kobunshi Butsuri-Soten'i Dainamikusu (Polymer Physics-Phase Transition Dynamics), by Masao Doi, p. 2, published by Iwanami Shoten, Publishers, 1992). Either type of the liquid-crystalline molecule may be used in the present invention, wherein it is preferable to use a rod-like liquid-crystalline compound or a discotic liquid-crystalline compound. A mixture of two or more kinds of rod-like liquid-crystalline compounds, a mixture of two or more kinds of discotic liquid-crystalline compounds, or a mixture of a rod-like liquid-crystalline compound and a discotic liquid-crystalline compound may also be used. It is more preferable that the optically anisotropic layer is formed using a rod-like liquid-crystalline compound having a reactive group or a discotic liquid-crystalline compound having a reactive group, because such a compound can reduce temperature- or moisture-dependent changes; and it is still further preferable that the optically anisotropic layer is formed using at least one compound having two or more reactive groups in a single liquid-crystalline molecule. The liquid-crystalline compound may be used in a form of a mixture of two or more kinds of compounds, wherein at least one of the compounds preferably has two or more reactive groups.

The optically anisotropic layer of the birefringent pattern builder of the first embodiment of the present invention is formed, in order to achieve both of an optical property and the convenience of handling, using the solution containing a liquid crystalline compound having at least two kinds of reactive groups. When the liquid crystalline compound is in a form of a mixture of two or more kinds of compounds, at least one of the compounds may have two or more kinds of reactive groups. In this case, the liquid crystalline compound having two or more kinds of reactive groups is preferably 20 mass % or more to the total mass of the liquid crystalline compounds, more preferably are 50 mass % or more, and particularly preferably 80 mass % or more.

It is also preferred that the liquid-crystalline compound has two or more kinds of reactive groups different in polymerization condition to each other. In such a case, an optically anisotropic layer comprising polymer having an unreacted reactive group can be produced by only polymerizing one kind of reactive group among plural types of reactive groups by selecting polymerization condition. The polymerization condition to be employed may be wavelength range of the irradiation of ionized radiation for the polymerization and fixing, or mechanism of polymerization. Preferably, the condition may be polymerization initiator, which can control polymerization of compound having a combination of a radically polymerizable group and a cationically polymerizable group. The combination of acrylic group and/or methacrylic group as the radically polymerizable group and vinyl ether group, oxetanyl group, and/or epoxy group as the cationically polymerizable group is particularly preferred, because the reactivity can be controlled easily.

Examples of the rod-like liquid-crystalline compound include azomethine compounds, azoxy compounds, cyanobiphenyl compounds, cyanophenyl esters, benzoates, cyclohexanecarboxylic acid phenyl esters, cyanophenylcyclohexane compounds, cyano-substituted phenylpyrimidine compounds, alkoxy-substituted phenylpyrimidine compounds, phenyldioxane compounds, tolan compounds, and alkenylcyclohexylbenzonitrile compounds. Not only the low-molecular-weight liquid-crystalline compounds as listed in the above, but also high-molecular-weight liquid-crystalline compounds may also be used. The high-molecular-weight liquid-crystalline compounds are compounds obtained by polymerizing a low-molecular-weight liquid-crystalline compound having a reactive group. Among such low-molecular-weight liquid-crystalline compounds, liquid-crystalline compounds represented by formula (I) are preferred.

$$Q^1\text{-}L^1\text{-}A^1\text{-}L^3\text{-}M\text{-}L^4\text{-}A^2\text{-}L^2\text{-}Q^2 \quad \text{Formula (I)}$$

In formula (I), $Q^1$ and $Q^2$ each independently represent a reactive group; $L^1$, $L^2$, $L^3$ and $L^4$ each independently represent a single bond or a divalent linking group; $A^1$ and $A^2$ each independently represent a spacer group having 2 to 20 carbon atoms; and M represents a mesogen group.

Hereinafter, the rod-shaped liquid crystalline compound having a reactive group represented by Formula (I) will be described in more detail. In formula (I), $Q^1$ and $Q^2$ each independently represent a reactive group. The polymerization reaction of the reactive group is preferably addition polymerization (including ring opening polymerization) or condensation polymerization. In other words, the reactive group is preferably a functional group capable of addition polymerization reaction or condensation polymerization reaction. Examples of reactive groups are shown below.

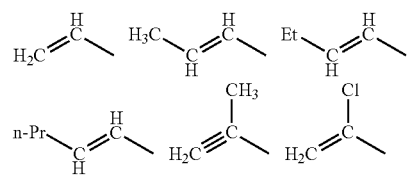

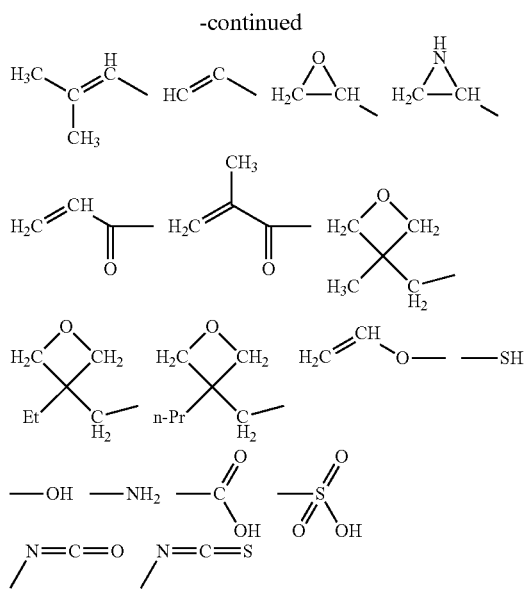

The divalent linking groups represented by $L^1$, $L^2$, $L^3$ and $L^4$ are preferably those selected from the group consisting of —O—, —S—, —CO—, —$NR^2$—, —CO—O—, —O—CO—O—, —$CH_2$—O—, —O—$CH_2$—, —CO—$NR^2$—, —$NR^2$—CO—, —O—CO—, —O—CO—$NR^2$—, —$NR^2$—CO—O— and —$NR^2$—CO—$NR^2$—. $L^1$ and $L^2$ each are preferably —O—. $R^2$ represents an alkyl group having 1 to 7 carbon atoms or a hydrogen atom. Of the groups represented by a combination of $Q^1$ and $L^1$, or of $Q^2$ and $L^2$, $CH_2$=CH—CO—O—, $CH_2$=C($CH_3$)—CO—O—, and $CH_2$=C(Cl)—CO—O—CO—O— are preferable, and $CH_2$=CH—CO—O— is most preferable.

$A^1$ and $A^2$ each are a spacer group having 2 to 20 carbon atoms; preferably an alkylene, alkenylene or alkynylene group having 2 to 12 carbon atoms; and particularly preferably an alkylene group. Alternatively, it is preferred that $A^1$ and $A^2$ each independently represent a straight-chain or branched-chain alkylene group having 2 to 20 carbon atoms wherein one $CH_2$ group or two or more $CH_2$ groups not adjacent to one another may be mutually independently substituted with —O—, —S—, —CO—, —CO—O—, —O—CO—, —O—CO—O—, —S—CO—, —CO—S—, —NH—, —CO—NH—, —NH—CO—, —N($CH_3$)—, —CH=CH—, or —C≡C—, respectively. The spacer group is more preferably has a chain form, and may contain non-neighboring oxygen atoms or sulfur atoms. The spacer group may have a substituent such as a halogen atom (fluorine, chlorine, bromine), a cyano group, a methyl group or an ethyl group.

The mesogen group represented by M may be selected from any known mesogen groups, and is preferably selected from the group represented by the formula (II).

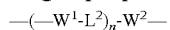   Formula (II)

In formula (II), each of $W^1$ and $W^2$ represent a divalent cyclic alkylene or alkenylene group, a divalent arylene group, or a divalent hetero-cyclic group; and $L^5$ represents a single bond or a linking group. Examples of the linking group represented by $L^5$ include those exemplified as examples of $L^1$ to $L^4$ in the formula (I) and —$CH_2$—O— and —O—$CH_2$—. In formula (II), n is 1, 2 or 3.

Examples of $W^1$ and $W^2$ include 1,4-cyclohexanediyl, 1,4-phenylene, pyrimidine-2,5-diyl, pyridine-2,5-diyl, 1,3,4-thiazole-2,5-diyl, 1,3,4-oxadiazole-2,5-diyl, naphtalene-2,6-diyl, naphtalene-1,5-diyl, thiophen-2,5-diyl, pyridazine-3,6-diyl. As for 1,4-cyclohexane diyl, either structural isomers having trans-form or cis-form, or any mixture based on an arbitrary compositional ratio may be used in the present invention, where the trans-form is preferable. Each of $W^1$ and $W^2$ may have a substituent, where the examples of the substituent include halogen atoms (fluorine, chlorine, bromine, iodine), cyano group, hydroxyl group, nitro group, or alkyl groups having 1 to 10 carbon atoms (methyl, ethyl, propyl, etc.), for which one or two or more hydrogen atoms can be substituted with F or Cl, alkoxy groups (methoxy, ethoxy, etc.), acyl groups (formyl, acetyl, etc.), alkoxycarbonyl groups (methoxycarbonyl, ethoxycarbonyl, etc.), acyloxy groups (acetyloxy, propionyloxy, etc.), nitro group, trifluoromethyl group, and difluoromethyl group.

Basic skeletons of the most preferable examples of the mesogen group represented by formula (II) are listed below. These groups may further be substituted by the above-described substituent.

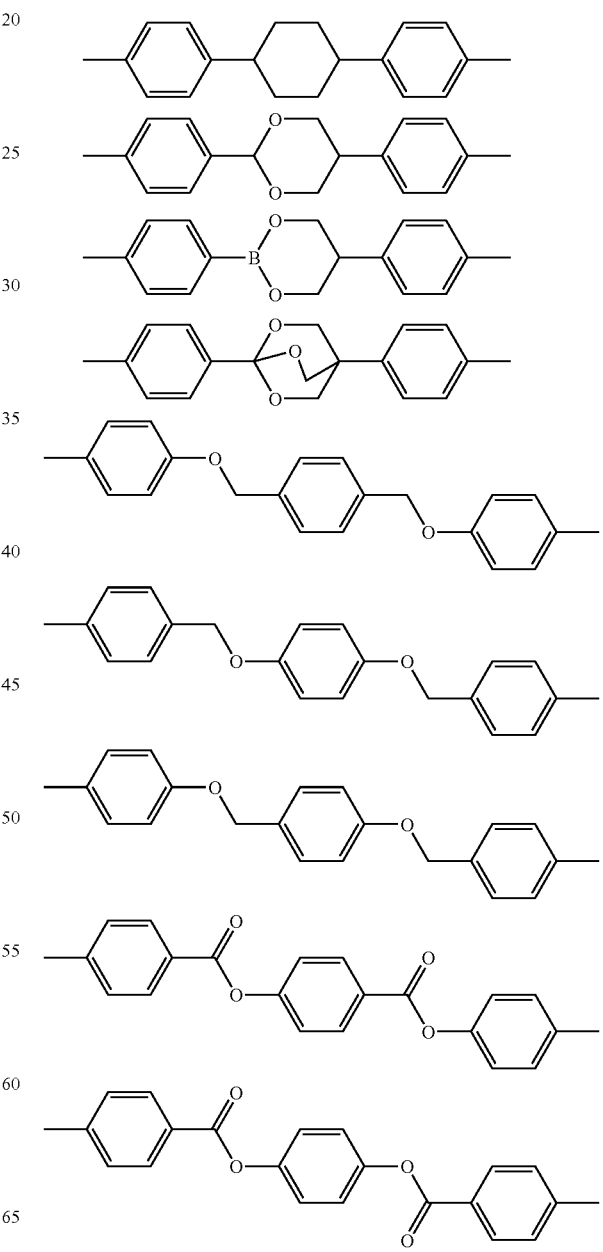

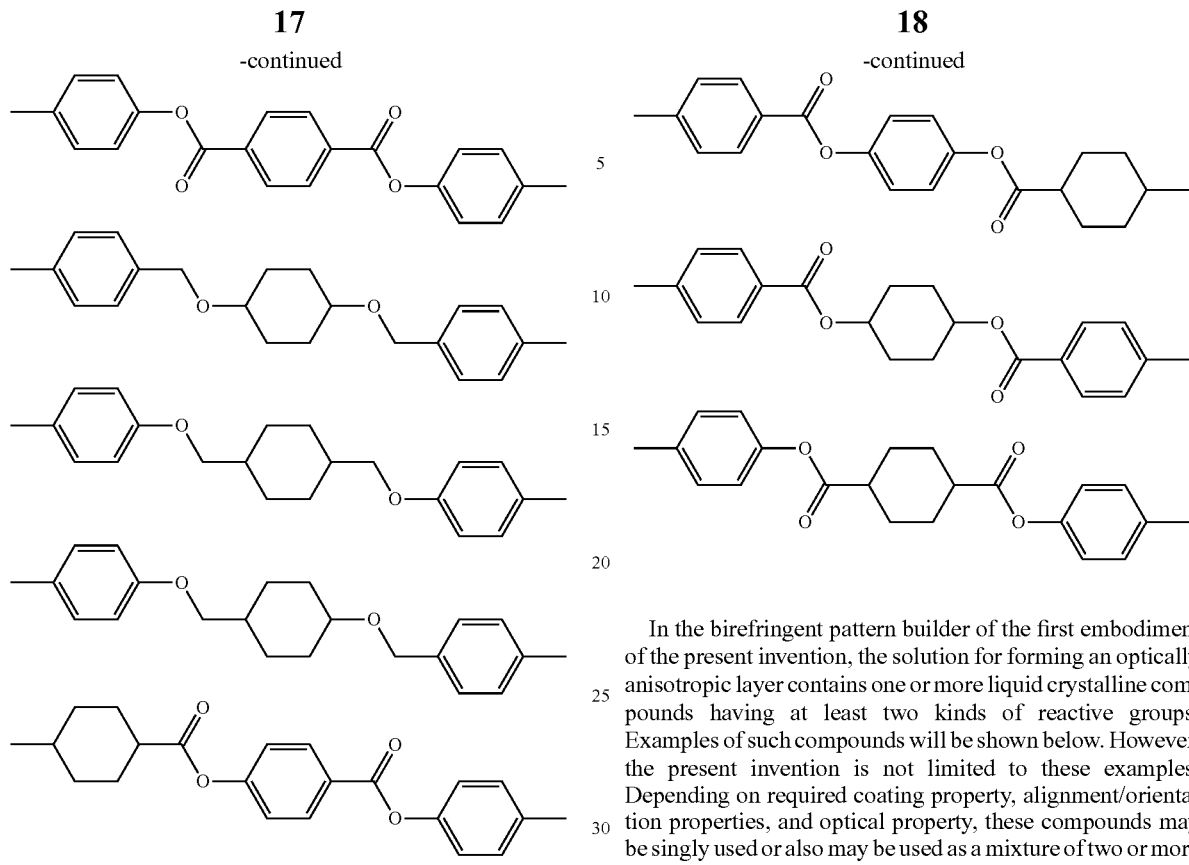

In the birefringent pattern builder of the first embodiment of the present invention, the solution for forming an optically anisotropic layer contains one or more liquid crystalline compounds having at least two kinds of reactive groups. Examples of such compounds will be shown below. However, the present invention is not limited to these examples. Depending on required coating property, alignment/orientation properties, and optical property, these compounds may be singly used or also may be used as a mixture of two or more types of compounds.

IA-1
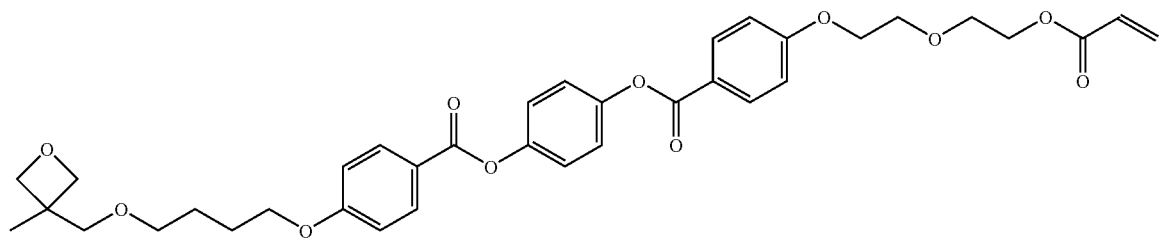

IA-2
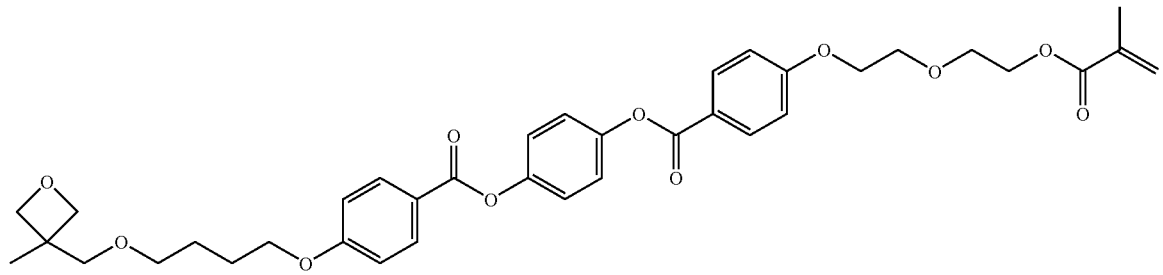

IA-3
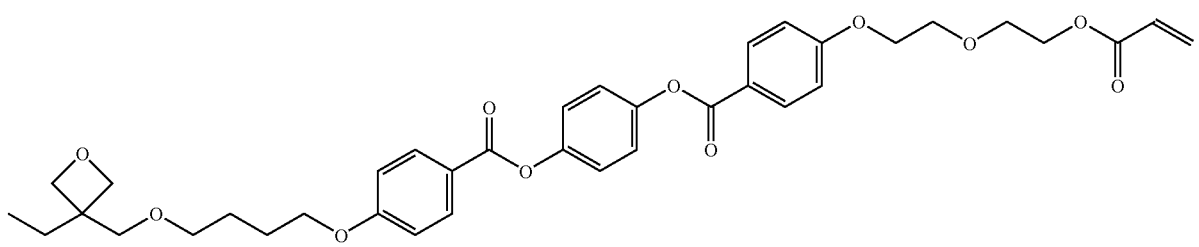

-continued

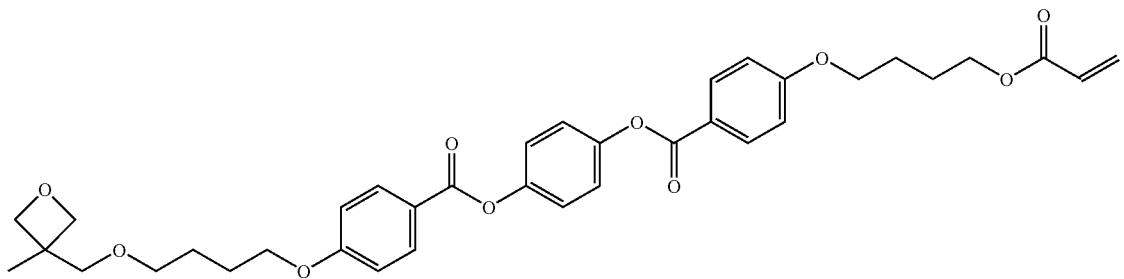
IA-4

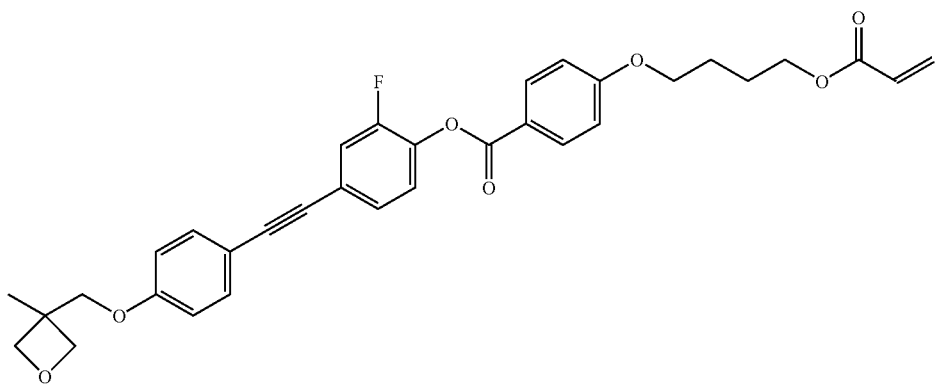
IA-5

On the other hand, the solution for forming an optically anisotropic layer in the birefringent pattern builder of the first embodiment of the present invention also may include, in order to adjust the coating property, alignment/orientation property, and optical property for example, not only the liquid crystalline compound having two or more kinds of reactive groups but also a more common liquid crystalline compound.

Examples of such a compound include, but not limiting the present invention, those described below. Such a compound may be prepared according to a method described in JP-T-11-513019 (WO 97/00600).

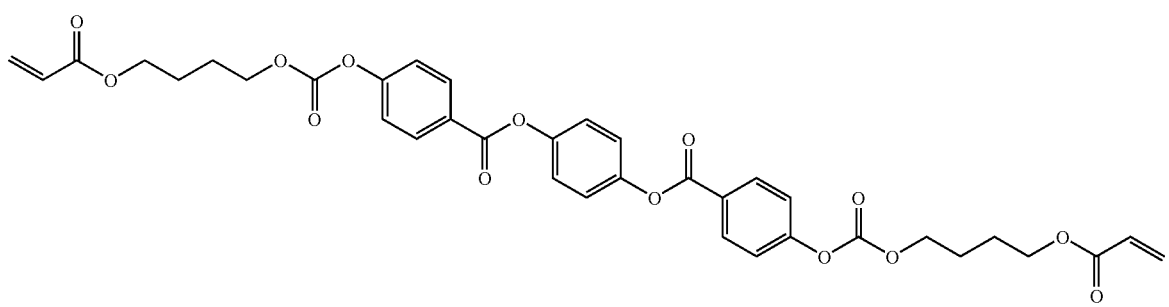
IB-1

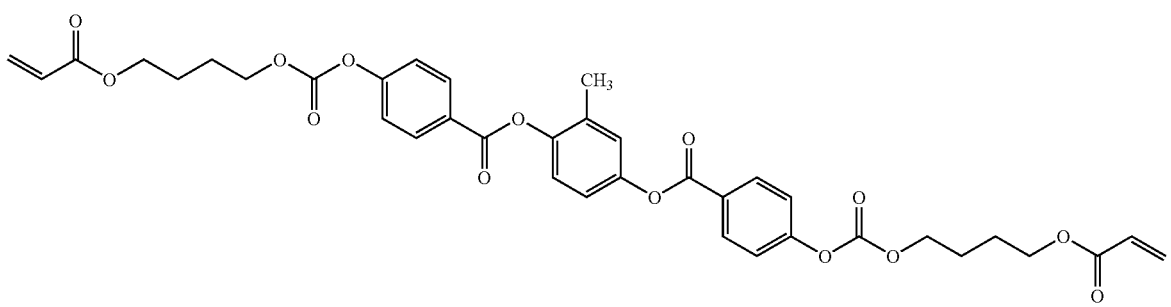
IB-2

IB-3
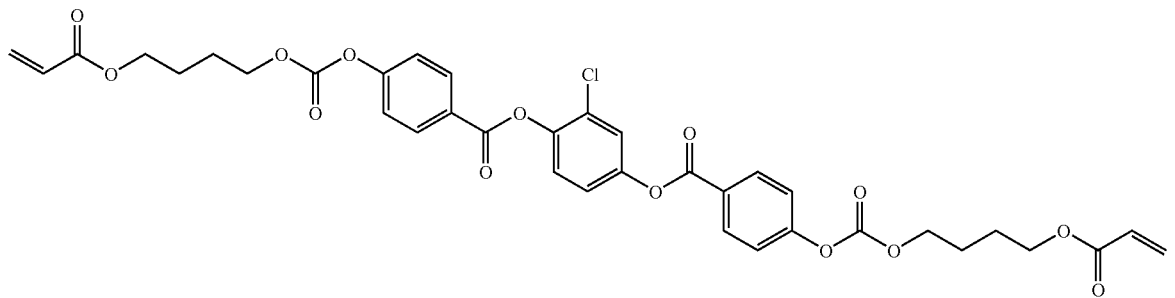
IB-4
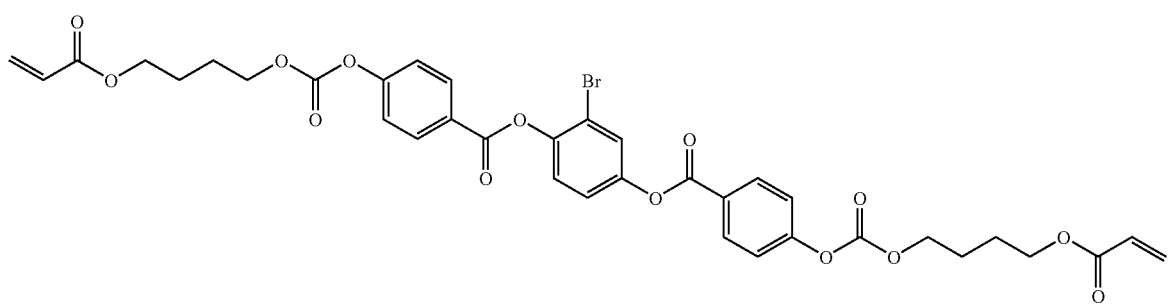
IB-5
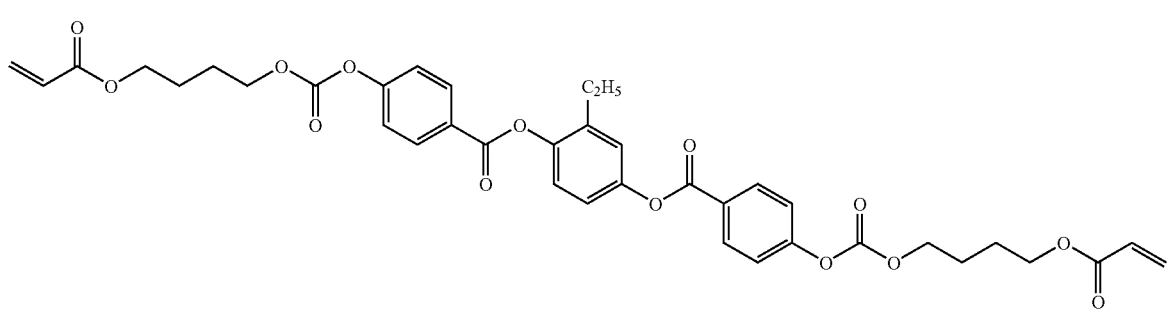
IB-6
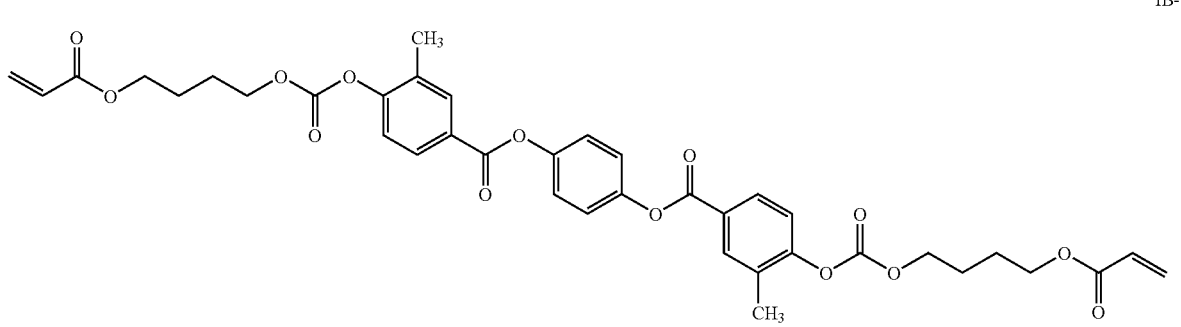
IB-7
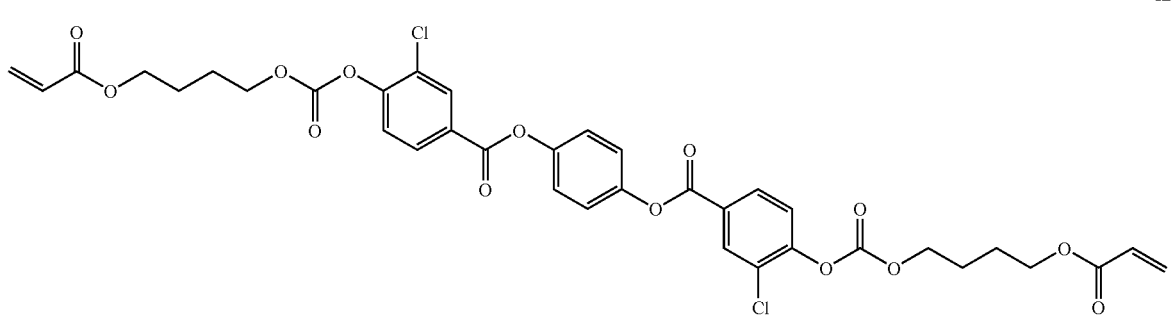

-continued
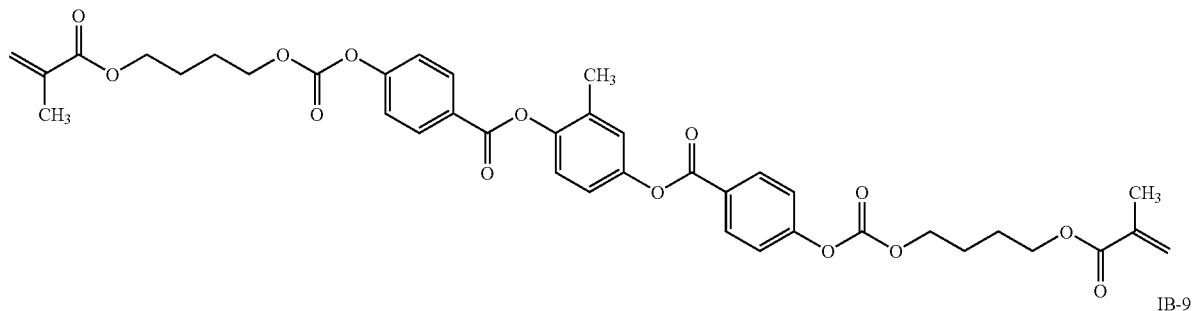
IB-8
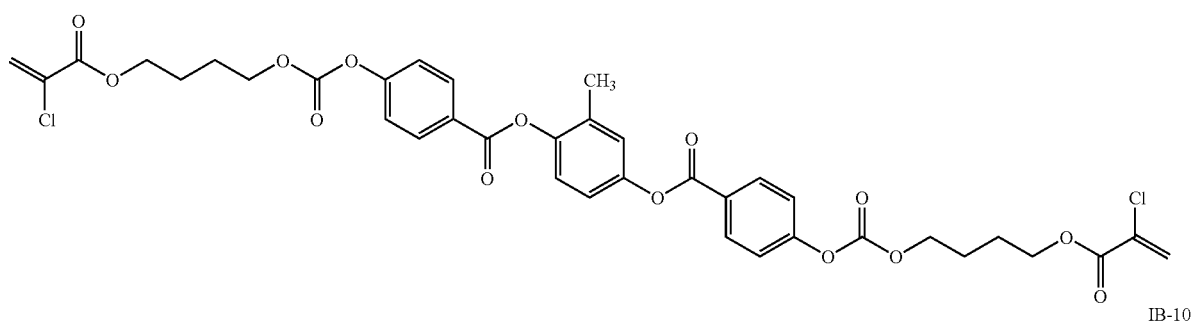
IB-9
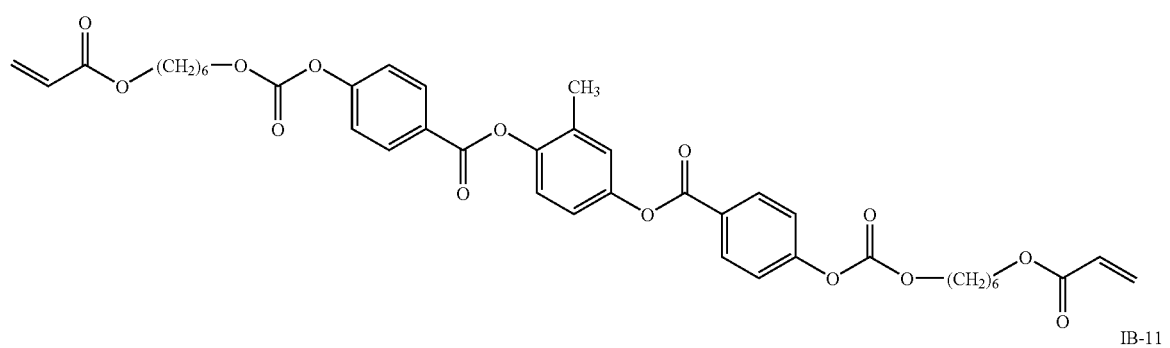
IB-10
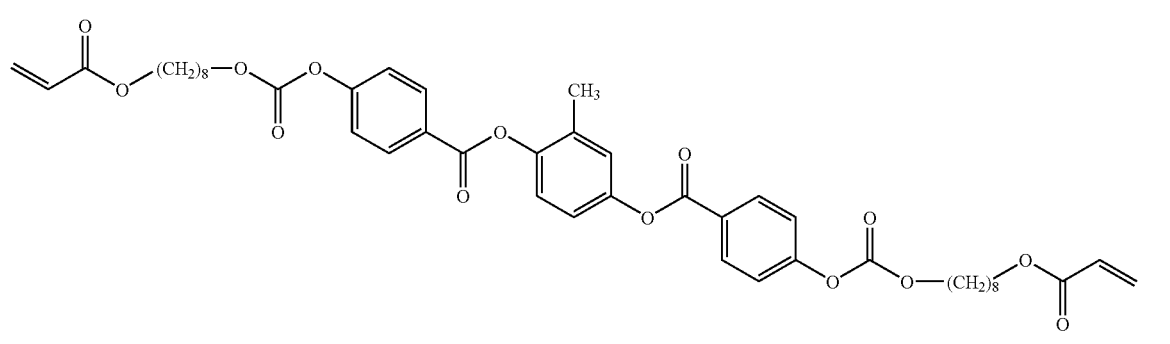
IB-11
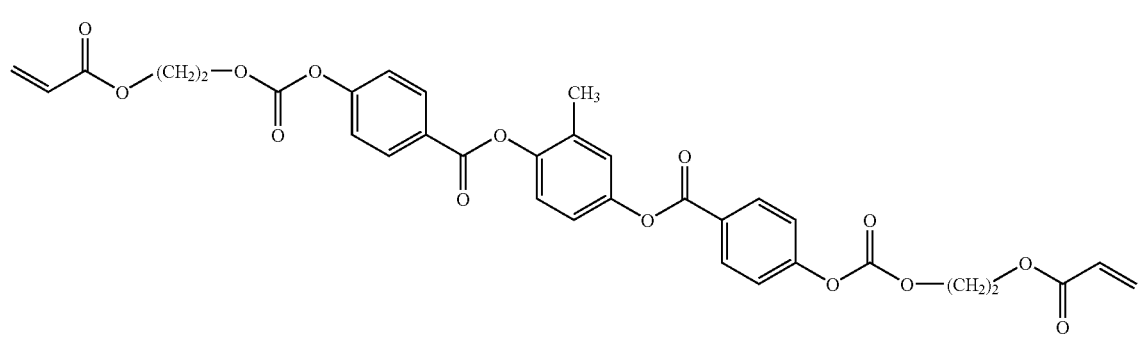
IB-12

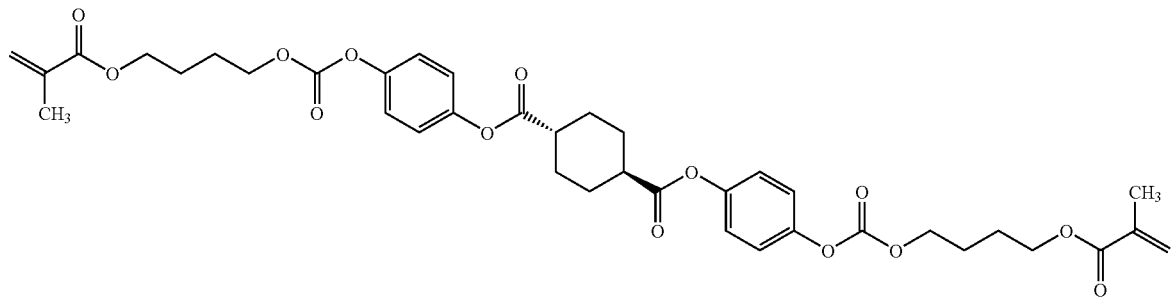
IB-13
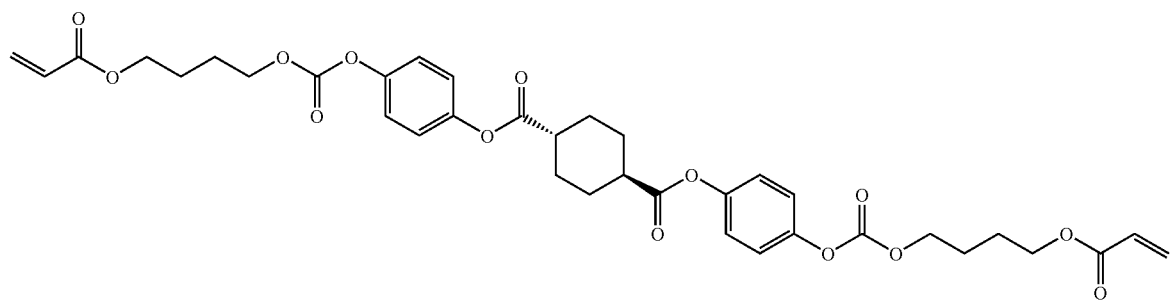
IB-14
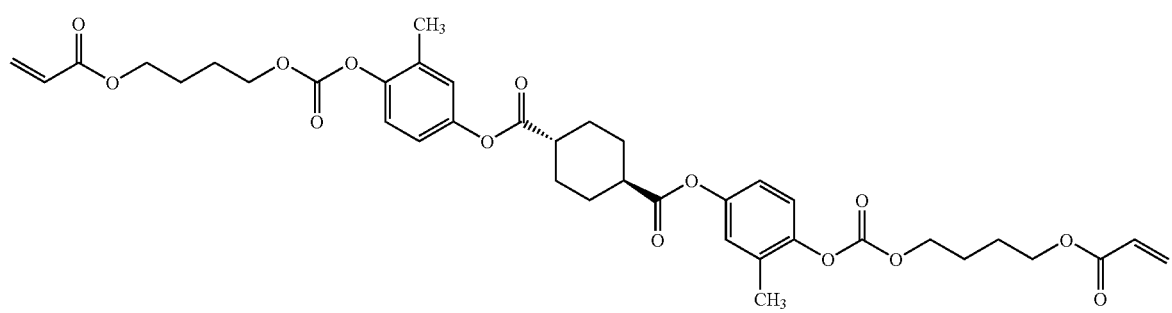
IB-15
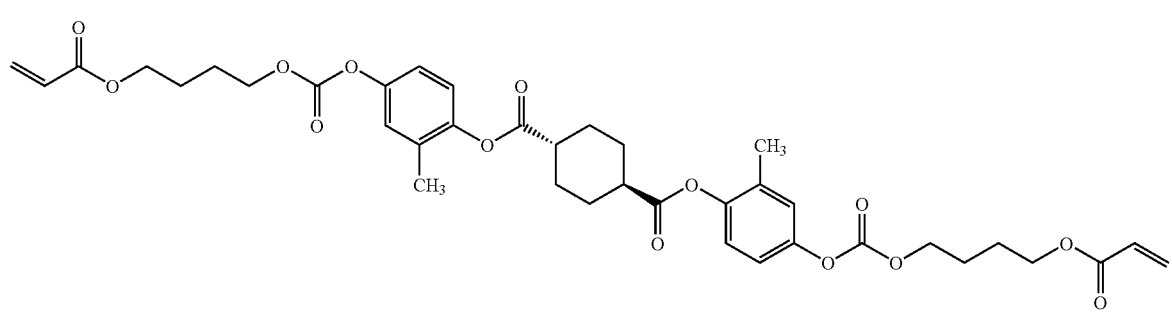
IB-16
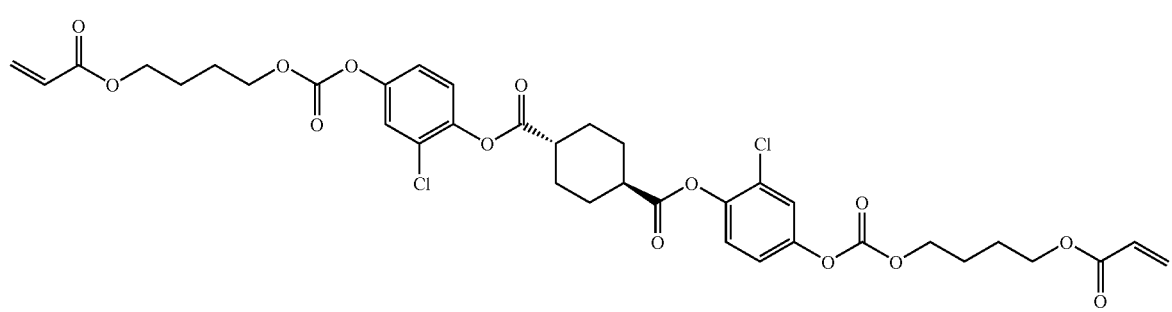
IB-17

-continued
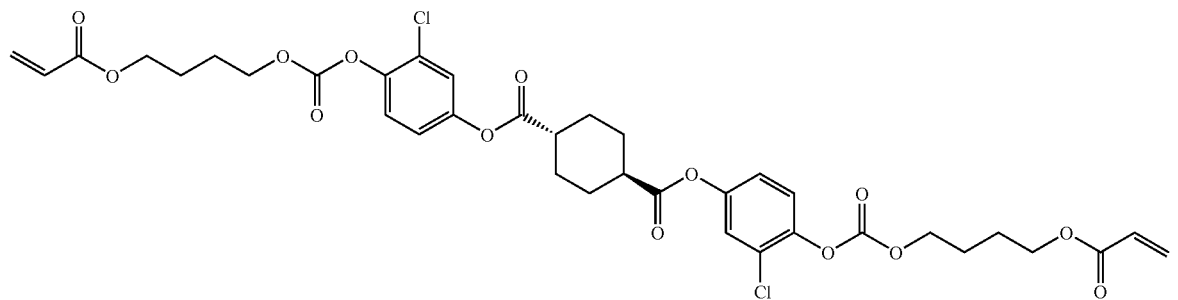
IB-18
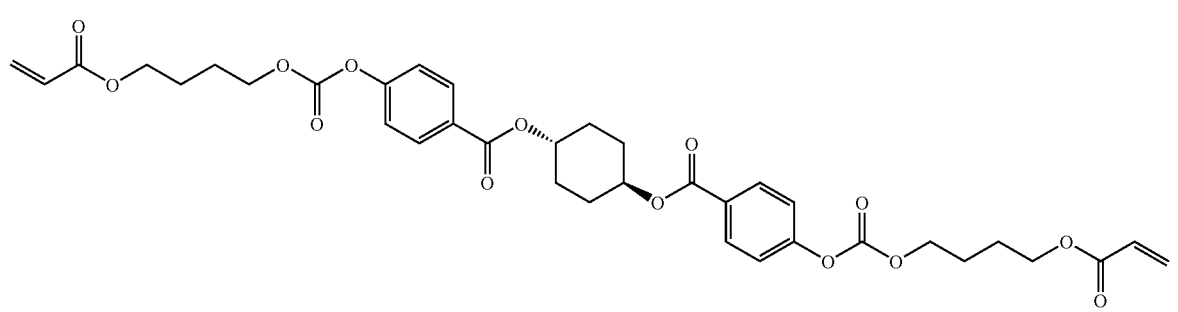
IB-19
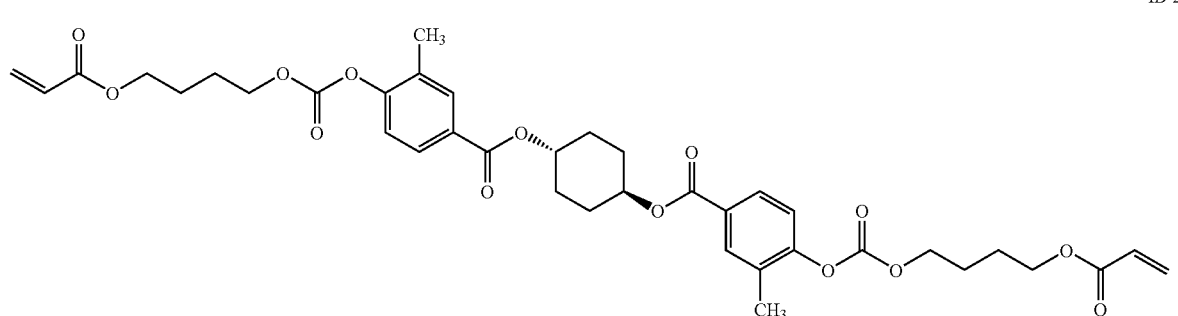
IB-20
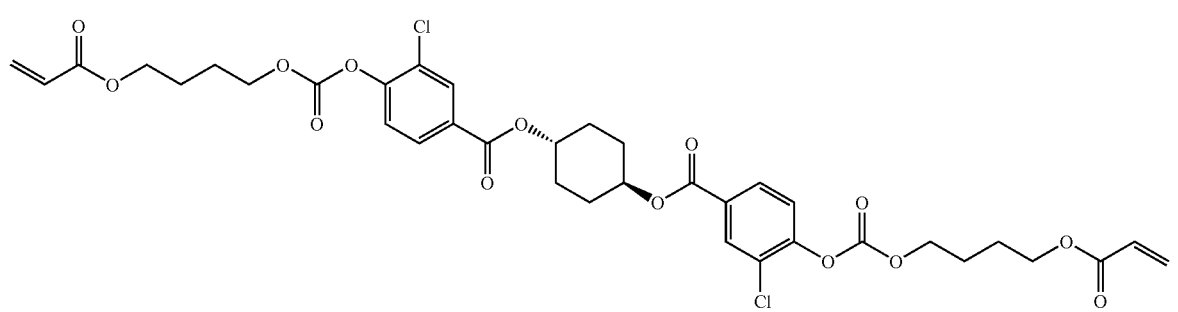
IB-21
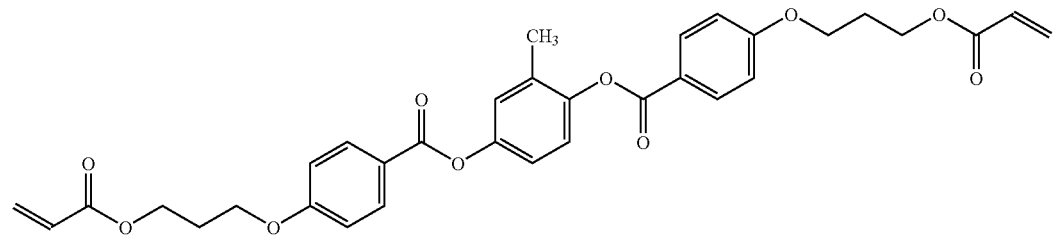
IB-22

-continued

IB-23

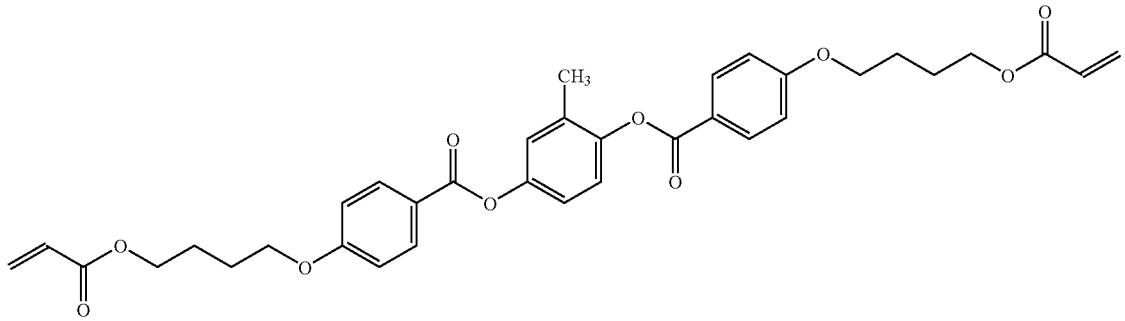

In another aspect of the present invention, a discotic liquid crystal is used in the optically anisotropic layer. The optically anisotropic layer is preferably a layer of a low-molecular-weight liquid-crystalline discotic compound such as monomer or a layer of a polymer obtained by polymerization (curing) of a polymerizable liquid-crystalline discotic compound. Examples of the discotic (disk-like) compounds include benzene derivatives disclosed in a study report of C. Destrade et al., Mol. Cryst., vol. 71, page 111 (1981); truxene derivatives disclosed in a study report of C. Destrade et al., Mol. Cryst., vol. 122, page 141 (1985), and Phyics. Lett., A, vol. 78, page 82 (1990); cyclohexane derivatives disclosed in a study report of B. Kohne et al., Angew. Chem. vol. 96, page 70 (1984); and azacrown series and phenylacetylene series macrocycles disclosed in a study report of J. M. Lehn et al., J. Chem. Commun. page 1794 (1985), and a study report of J. Zhang et al., J. Am. Chem. Soc. vol. 116, page 2655 (1994). The above mentioned discotic (disk-like) compounds generally have a discotic core in the central portion and groups (L), such as linear alkyl or alkoxy groups or substituted benzoyloxy groups, which are substituted radially from the core. Among them, there are compounds exhibiting liquid crystallinity, and such compounds are generally called as discotic liquid crystal. However, such molecular assembly in uniform orientation shows negative uniaxiality, although it is not limited to the description. In the specification, the term of "formed of a discotic compound" is used to mean not only when finally comprising the discotic compound as a low-molecular weight compound, but also when finally comprising a high-molecular weight discotic compound, no longer exhibiting liquid crystallinity, formed by carrying out polymerizing or crosslinking reaction of the low-molecular weight discotic compound having at least one reactive group capable of thermal reaction or photo reaction under heating or under irradiation of light.

In the present invention, it is preferred to use the discotic liquid-crystalline compound represented by formula (III).

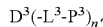 Formula (III)

In formula (III), $D^3$ represents a disc core; $L^3$ represents a divalent linking group; $P^3$ is a polymerizable group; and n' represents an integer of 4 to 12. It is noted that n'Ps preferably have at least two kinds of reactive groups.

Preferable examples of the disc core ($D^3$), the divalent linking group ($L^3$) and the polymerizable group ($P^3$) in formula (III) are (D1) to (D15), (L1) to (L25), and (P1) to (P18), respectively, described in JP-A-2001-4837; and the contents of the patent publication are preferably employed in the present invention.

Preferred examples of the above discotic compound include compounds disclosed in paragraph Nos. [0045] to [0055] of JP-A-2007-121986.

The optically anisotropic layer is preferably formed according to a method comprising applying a composition containing liquid crystalline compound (e.g., a coating liquid) to a surface of an alignment layer, described in detail later, aligning liquid crystalline molecules as to make an aligned state exhibiting a desired crystalline phase, and fixing the aligned state under heating or light-irradiating.

The liquid crystalline compounds may be fixed in any alignment state such as a horizontal alignment state, vertical alignment state, tilted alignment state, and twisted alignment state. In the specification, the term "horizontal alignment" means that, regarding rod-like liquid-crystalline molecules, the molecular long axes thereof and the horizontal plane of a support are parallel to each other, and, regarding discotic liquid-crystalline molecules, the disk-planes of the cores thereof and the horizontal plane of a support are parallel to each other. However, they are not required to be exactly parallel to each other, and, in the specification, the term "horizontal alignment" should be understood as an alignment state in which molecules are aligned with a tilt angle against a horizontal plane less than 10°. The tilt angle is preferably from 0° to 5°, more preferably 0° to 3°, much more preferably from 0° to 2°, and most preferably from 0° to 1°.

When two or more optically anisotropic layers formed of the compositions containing liquid-crystalline compounds are stacked, the combination of the liquid-crystalline compounds is not particularly limited, and the combination may be a stack formed of layers all comprising discotic liquid-crystalline compounds, a stack formed of layers all comprising rod-like liquid-crystalline compounds, or a stack formed of a layer comprising discotic liquid-crystalline compounds and a layer comprising rod-like liquid-crystalline compounds. Combination of orientation state of the individual layers also is not particularly limited, allowing stacking of the optically anisotropic layers having the same orientation states, or stacking of the optically anisotropic layer having different orientation states.

The optically-anisotropic layer is preferably formed by applying a coating solution, which contains at least one liquid-crystalline compound, the following polymerization initiator and other additives, on a surface of an alignment layer described below. Organic solvents are preferably used as a solvent for preparing the coating solution, and examples thereof include amides (e.g., N,N-dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methylethylketone), and ethers (e.g., tetrahydrofuran, 1,2-dimethoxyethane). In particular, alkyl halides and ketones are preferable. Two or more kinds of organic solvents may be used in combination.

[Fixing of Liquid-Crystalline Compounds in an Alignment State]

It is preferred that the liquid-crystalline compounds in an alignment state are fixed without disordering the state. Fixing is preferably carried out by the polymerization reaction of at least one of the reactive groups contained in the liquid-crystalline compounds. The polymerization reaction includes thermal polymerization reaction using a thermal polymerization initiator and photo-polymerization reaction using a photo-polymerization initiator. Photo-polymerization reaction is preferred. Photo-polymerization reaction may be any of radical polymerization and cation polymerization. However, when liquid crystalline compounds having a radically reactive group and a cationically reactive group are used for example, any one of the photo-polymerization reactions is preferably carried out in order to react any of the reactive groups of the liquid crystalline compounds to thereby fix polymer.

Examples of the radical photo-polymerization initiators include α-carbonyl compounds (described in U.S. Pat. Nos. 2,367,661 and 2,367,670), acyloin ethers (described in U.S. Pat. No. 2,448,828), α-hydrocarbon-substituted aromatic acyloin compounds (described in U.S. Pat. No. 2,722,512), polynuclear quinone compounds (described in U.S. Pat. Nos. 3,046,127 and 2,951,758), combinations of a triarylimidazole dimer with p-aminophenyl ketone (described in U.S. Pat. No. 3,549,367), acridine and phenazine compounds (described in JP-A-60-105667 and U.S. Pat. No. 4,239,850), and oxadiazol compounds (described in U.S. Pat. No. 4,212,970).

As the cationic-polymerization initiator, examples include organic sulfonium salts, iodonium salts, and phosphonium salts. The organic sulfonium salts are preferred, and triphenyl sulfonium salts are particularly preferred. As a counter ion of these compounds, hexafluoroantimonate, hexafluorophosphate, or the like is preferably used.

It is preferable to use the photopolymerization initiator in an amount of 0.01 to 20 mass %, more preferably 0.5 to 5 mass %, based on the solid content in the coating solution. In the photoirradiation for polymerizing the liquid crystalline compounds, it is preferable to use ultraviolet ray. The irradiation energy is preferably from 10 mJ/cm$^2$ to 10 J/cm$^2$, more preferably from 25 to 800 mJ/cm$^2$. Illuminance is preferably 10 to 1,000 mW/cm$^2$, more preferably 20 to 500 mW/cm$^2$, and further preferably 40 to 350 mW/cm$^2$. The irradiation wavelength has a peak falling within the range from preferably 250 to 450 nm, more preferably 300 to 410 nm. Irradiation may be carried out in an atmosphere of inert gas such as nitrogen gas and/or under heating to facilitate the photo-polymerization reaction.

[Orientation Induced by Irradiation of Polarized Light (Photoinduced Orientation)]

The optically anisotropic layer may exhibit or enhance in-plane retardation attributed to photoinduced orientation with the aid of polarized light irradiation. The polarized light irradiation may be carried out in photo-polymerization process in the fixation of orientation, or the polarized light irradiation may precede and then may be followed by non-polarized light irradiation for further fixation, or the non-polarized light irradiation for fixation may precede and the polarized light irradiation may succeed the photoinduced orientation. It is preferred that only the polarized light irradiation is conducted or the polarized light irradiation precedes and is followed by non-polarized light irradiation for further fixation. When the polarized light irradiation is carried out in photo-polymerization process in the fixation of orientation and a radical photo-polymerization initiator is used as the photo-polymerization initiator, the polarized light irradiation is preferably carried out under an inert gas atmosphere having an oxygen concentration of 0.5% or below. The irradiation energy is preferably 20 mJ/cm$^2$ to 10 j/cm$^2$, and more preferably 100 mJ/cm$^2$ to 800 mJ/cm$^2$. The illuminance is preferably 20 to 1,000 mW/cm$^2$, more preferably 50 to 500 mW/cm$^2$, and still more preferably 100 to 350 mW/cm$^2$. Types of the liquid-crystalline compound to be cured by the polarized light irradiation are not particularly limited, wherein the liquid-crystalline compound having an ethylenically unsaturated group as the reactive group is preferable. It is preferred that the irradiation light to be used has a peak falling within the range from 300 to 450 nm, more preferred from 350 to 400 nm.

[Post-Curing with UV-Light Irradiation after Irradiation of Polarized Light]

After the first irradiation of polarized light for photoinduced orientation (the irradiation for photoinduced orientation), the optically anisotropic layer may be irradiated with polarized or non-polarized ultraviolet light so as to improve the reaction rate (post-curing step) of the reactive groups. As a result, the adhesiveness is improved and, thus, the optically anisotropic layer can be produced with larger feeding speed. The post-curing step may be carried out with polarized or non-polarized light, and preferably with polarized light. Two or more steps of post-curing are preferably carried out with only polarized light, with only non-polarized light or with combination of polarizing and non-polarized light. When polarized and non-polarized light are combined, irradiating with polarized light previous to irradiating with non-polarized light is preferred. The irradiation of UV light may be or may not be carried out under an inert gas atmosphere. However, when a radical photo-polymerization initiator is used as the photo-polymerization initiator, the irradiation may be carried out preferably under an inert gas atmosphere where the oxygen gas concentration is 0.5% or lower. The irradiation energy is preferably 20 mJ/cm$^2$ to 10 J/cm$^2$, and more preferably 100 to 800 mJ/cm$^2$. The illuminance is preferably 20 to 1,000 mW/cm$^2$, more preferably 50 to 500 mW/cm$^2$, and still more preferably 100 to 350 mW/cm$^2$. As the irradiation wavelength, the irradiation of polarized light has a peak falling within the range preferably from 300 to 450 nm, more preferably from 350 to 400 nm. The irradiation of non-polarized light has a peak falling within the range preferably from 200 to 450 nm, more preferably from 250 to 400 nm.

[Fixing the Alignment State of Liquid-Crystalline Compounds Having Radically Reactive Group and Cationically Reactive Group]

As described above, at least two reactive groups of the two or more kinds of reactive groups of the liquid crystalline compound preferably have different polymerization condition from one another. In such a case, an optically anisotropic layer comprising a polymer having an unreacted reactive group can be produced by polymerizing only one kind of reactive groups among plural kinds of reactive groups by selecting polymerization condition. The conditions which are suitable for the polymerization and fixation of the liquid-crystalline compounds having radically reactive group and cationically reactive group (the aforementioned IA-1 to IA-5 as specific examples) are explained below.

First, as the polymerization initiator, only a photopolymerization initiator which acts on a reactive group intended to be polymerized is preferred to be used. That is, it is preferred that, only radical photopolymerization initiator is used when radically reactive groups are selectively polymerized, and only cationic photopolymerization initiator is used when cationically reactive groups are selectively polymerized. The content of the photopolymerization initiator falls in the range preferably from 0.01 to 20% by mass, more preferably from 0.1 to 8% by mass, and further preferably from 0.5 to 4% by mass of the total solid content in the coating solution.

Second, light irradiation for the polymerization is preferably conducted by using ultraviolet ray. When the irradiation energy and/or illuminance are too high, non-selective reaction of both of the radically reactive group and cationically reactive group is of concern. In view of the above, the irradiation energy is preferably 5 mJ/cm$^2$ to 500 mJ/cm$^2$, more preferably 10 to 400 mJ/cm$^2$, and particularly preferably 20 to 200 mJ/cm$^2$. The illuminance is preferably 5 to 500 mW/cm$^2$, more preferably 10 to 300 mW/cm$^2$, and particularly preferably 20 to 100 mW/cm$^2$. As the irradiation wavelength, the light has a peak falling within the range preferably from 250 to 450 nm, more preferably from 300 to 410 nm.

Among photopolymerization reaction, the reaction by using a radical photopolymerization initiator is inhibited by oxygen, and the reaction by using a cationic photopolymerization initiator is not inhibited by oxygen. Therefore, when one of the reactive groups of the liquid-crystalline compounds having radically reactive group and cationically reactive group is selectively reacted, it is preferred that the light irradiation is carried out in an atmosphere of inert gas such as nitrogen gas when the radically reactive group is selectively reacted, and in an atmosphere containing oxygen (for example, in air atmosphere) when the cationically reactive group is selectively reacted.

When only one kind of reactive groups among the two or more kinds of reactive groups of the liquid crystalline compounds is polymerized, the number of reactive groups to be polymerized in the liquid crystalline compound is preferably two (2) or less per one molecule, more preferably one (1) per one molecule. By preventing the number of reactive groups to be polymerized in the liquid crystalline compound from being excessively high, an excessive polymerization can be suppressed. Thus, the optically anisotropic layer after the polymerization can be expected to have the retardation disappearance temperature. The optically anisotropic layer after the polymerization has a retardation disappearance temperature of preferably higher than 20° C. and 250° C. or less, more preferably 40 to 245° C., further preferably 50 to 245° C., and most preferably 80 to 240° C.

Examples of the optically anisotropic layer formed by selectively polymerizing the radically reactive group include an optically anisotropic layer comprising a polymer containing a structural unit represented by formula (102).

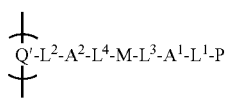

Formula (102)

In formula (102), P represents a partial structure represented by any one of formulae (3-1) to (3-3).

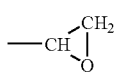

Formula (3-1)

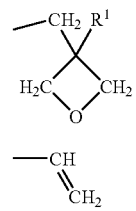

Formula (3-2)

Formula (3-3)

In formulae (3-1) to (3-3), $R^1$ represents an alkyl group having 1 to 4 carbon atoms.

In formula (102), Q' represents a partial structure represented by formula (6-1) or (6-2).

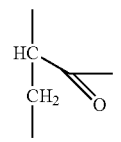

Formula (6-1)

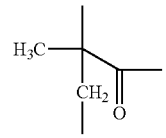

Formula (6-2)

Examples of the optically anisotropic layer formed by selectively polymerizing the cationically reactive group include an optically anisotropic layer comprising a polymer containing a structural unit represented by formula (101).

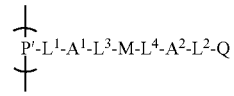

Formula (101)

In formula (101), Q represents an unreacted reactive group represented by formula (5-1) or (5-2).

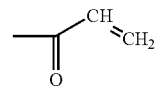

Formula (5-1)

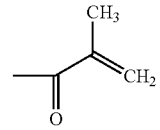

Formula (5-2)

P' represents a partial structure represented by any one of formulae (4-1) to (4-3).

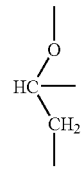

Formula (4-1)

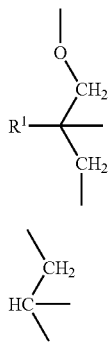

Formula (4-2)

Formula (4-3)

In formulae (4-1) to (4-3), $R^1$ represents an alkyl group having 1 to 4 carbon atoms.

In the formula (101) and formula (102), $L^1, L^2, L^3, L^4, A^1, A^2$ and M have the same meanings as those of $L^1, L^2, L^3, L_4, A^1, A^2$ and M in formula (I), respectively. $L^1$ is preferably —O—.

[Horizontal Orientation Agent]

At least one kind of compound selected from the group consisting of the compounds represented by formula (1), (2) or (3) described in paragraph Nos. [0068] to [0072] of JP-A-2007-125986, and fluorine-containing homopolymer or copolymer using the monomer represented by formula (4), which are shown below, may be added to the composition used for forming the optically anisotropic layer, in order to align the molecules of the liquid-crystalline compounds substantially horizontally.

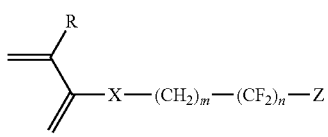

Formula (4)

In formula (4), R represents a hydrogen atom or a methyl group, X represents an oxygen atom or a sulfur atom, Z represents a hydrogen atom or a fluorine atom; m represents an integer of 1 to 6, and n represents an integer of 1 to 12. In addition to the fluorine-containing polymer prepared by using the monomer represented by formula (4), the polymer compounds described in JP-A-2005-206638 and JP-A-2006-91205 can be used as horizontal orientation agents for reducing unevenness in coating. The methods of preparation of the compounds are also described in the publications.

The amount of the horizontal orientation agents added is preferably 0.01 to 20% by mass, more preferably 0.01 to 10% by mass, and most preferably 0.02 to 1% by mass with respect to the mass of the liquid crystalline compound. The compounds represented by any of the aforementioned formulae (1) to (4) may be used singly, or two or more types of them may be used in combination.

[Optically Anisotropic Layer Produced by Stretching)

The optically anisotropic layer may be produced by stretching a polymer. When a polymer in the optically anisotropic layer, which is preferred to have at least one unreacted reactive group as described above, is produced, a polymer having a reactive group may be stretched or a reactive group may be introduced by using a coupling agent or the like to an optically anisotropic layer prepared by stretching. The characteristics of the optically anisotropic layer obtained by stretching include low cost, self-supporting property (a support is not needed when the layer is formed or maintained), and the like.

[Post-Treatment of Optically Anisotropic Layer]

Various post-treatments may be conducted to modify the optically anisotropic layer produced. Examples of the post treatments include corona treatment for improving adhesiveness, addition of a plasticizer for improving plasticity, addition of a heat polymerization inhibitor for improving storage stability, and coupling treatment for improving reactivity. When the polymer in the optically anisotropic layer has an unreacted reactive group, addition of a polymerization initiator suited to the reactive group may also be a useful modification method. For example, by addition of a radical photopolymerization initiator to an optically anisotropic layer fixed by polymerization of a liquid crystalline compound having a cationically reactive group and a radically reactive group by using a cationic photopolymerization initiator, the reaction of the unreacted radically reactive group in the patterned light exposure afterward can be promoted. As the method of addition of the plasticizer or the photopolymerization initiator, examples include immersing the optically anisotropic layer in a solution of the desired additive, and applying a solution of the desired additive to the optically anisotropic layer for the permeance of the solution. Further, when another layer is applied to the optically anisotropic layer, the desired additive may be added to the coating solution of the layer for permeance to the optically anisotropic layer.

[Other Functional Layers in Birefringent Pattern Builder]

The birefringent pattern builder may include a functional layer which can be applied with various accessory functions, other than the optically anisotropic layer. Examples of the functional layer include a support, an alignment layer, a reflective layer, and a post-adhesive layer. Further, the birefringent pattern builder used as a transferring material or the birefringent pattern builder produced by using a transferring material may include a temporary support, an adhesive layer for transfer, or a dynamic property control layer.

[Functional Layer Containing Polymerization Initiator]

In the birefringent pattern builder of the present invention, the optically anisotropic layer preferably has thereon a functional layer containing at least one kind of polymerization initiator having a function for starting the polymerization reaction by the unreacted reactive group in the optically anisotropic layer. The polymerization initiator having a function for starting the polymerization reaction by the unreacted reactive group in the optically anisotropic layer may be, for example, a radical photo-polymerization initiator when an optically anisotropic layer obtained by polymerizing and fixing the liquid crystalline compound having a cationically reactive group and a radically reactive group by a cation photo-polymerization initiator, and may be a cation photo-polymerization initiator when an optically anisotropic layer obtained by polymerizing and fixing the liquid crystalline compound having a cationically reactive group and a radically reactive group by a radical photo-polymerization initiator. The optically anisotropic layer is preferably adjacent to the functional layer. By the configuration as described above, such birefringent pattern builder can be provided that can be used to form a birefringent pattern by the pattern-like heat treatment or irradiation of ionizing radiation without adding another polymerization initiator. In this case, the functional layer contains the photo-polymerization initiator in an amount of preferably 0.01 to 20 mass %, more preferably 0.2 to 5 mass % of the solid content of the functional layer.

The functional layer containing the polymerization initiator also may have the function of another layer (which will be described later) (e.g., post-adhesive layer, adhesive layer for transfer).

[Support]

The birefringent pattern builder may contain a support for the purpose of maintaining the dynamic stability. The support used for the birefringent pattern builder is not particularly limited, and it may be rigid or flexible. In particular, such a support is preferred that is suitable to be bonded or adhered to the laminated structure material of the second embodiment of the present invention.

As a rigid support, examples include, although not particularly limited to, known glasses such as soda glass sheet having a silicon oxide film formed on the surface thereof, low-expansion glass, non-alkali glass, and silica glass sheet; metal plates such as aluminum plate, iron plate, and SUS plate; resin plate, ceramic plate, and stone plate. As a flexible support, examples include, although not particularly limited to, plastic films such as cellulose ester (for example, cellulose acetate, cellulose propionate, and cellulose butyrate), polyolefin (for example, norbornene based polymer), poly(meth)acrylate (for example, polymethylmethacrylate), polycarbonate, polyester, and polysulfone; paper, aluminum foil, and fabric. In view of the convenience of handling, the thickness of the rigid support is preferably 100 to 3,000 μm, and more preferably 300 to 1,500 μm. The thickness of the flexible support is preferably 3 to 500 μm, and more preferably 10 to 200 μm.

The support is preferred to have heat-resistance sufficient for preventing coloring or deformation in the after-mentioned baking step. The support is also preferred to have reflective function itself instead of provided with the after-mentioned reflective layer separately.

In the birefringent pattern builder of the first embodiment of the present invention, when the support is a substrate of a liquid crystal display device, the support is preferably transparent. The substrate of a liquid crystal display device may be a known glass sheet such as a soda glass sheet having a silicon oxide film formed on the surface thereof, low-expansion glass, non-alkali glass, and a silica glass sheet or a transparent substrate made of a polymer. In the case of a support for a liquid crystal display device, since a step of producing a substrate for a liquid crystal display device requires a high-temperature process of 180° C. or more for baking a color filter and an alignment/orientation film, the support preferably has heat resistance. Such a heat-resistant substrate is preferably a glass sheet, polyimide, polyether sulfone, heat-resistant polycarbonate, or polyethylene naphthalate; and particularly preferably a glass sheet from the viewpoints of price, transparency, and heat resistance. When the substrate is subjected to a coupling processing in advance, a favorable adhesion between the substrate and the adhesive layer for transfer can be obtained. The coupling processing may be preferably the method disclosed in JP-A-2000-39033. Although not particularly limited, the substrate has a film thickness of generally preferably from 100 to 1,200 μm, particularly preferably from 300 to 1,000 μm.

[Alignment Layer]

As described above, an alignment layer may be used for forming the optically anisotropic layer. The alignment layer may be generally formed on the surface of a support or a temporary support, or on the surface of an undercoating layer formed on the support or the temporary support. The alignment layer has function of controlling the alignment of liquid crystalline compounds thereon, and, as far as having such a function of giving the alignment to the optically anisotropic layer, may be selected from various known alignment layers.

The alignment layer that can be employed in the present invention may be provided by rubbing a layer formed of an organic compound (preferably a polymer), oblique vapor deposition of an inorganic compound, formation of a layer with microgrooves, or the deposition of ω-tricosanoic acid, dioctadecylmethylammonium chloride, methyl stearate or the like by the Langmuir-Blodgett (LB) film method. Further, alignment layers in which dielectric is oriented by applying an electric or magnetic field are also exemplified.

Examples of the organic compound, which can be used for forming the alignment layer, include polymers such as polymethyl methacrylate, acrylic acid/methacrylic acid copolymer, styrene/maleimide copolymer, polyvinyl alcohol, poly (N-methylol acrylamide), polyvinylpyrrolidone, styrene/vinyl toluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, carboxymethyl cellulose, polyethylene, polypropylene and polycarbonates; and silane coupling agents. Preferred examples of the polymer include polyimide, polystyrene, styrene based polymers, gelatin, polyvinyl alcohol and alkyl-modified polyvinyl alcohol having at least one alkyl group (preferably an alkyl group having carbon atoms of 6 or more).

For production of an alignment layer, a polymer may preferably used. The types of the polymer, which is used for forming the alignment layer, may be decided depending on what types of alignment of liquid crystalline compound (in particular, the average tilt angle). For forming an alignment layer capable of aligning liquid crystalline compounds horizontally, a polymer which does not lower the surface energy of the alignment layer (a usual polymer for forming alignment layer) is used. Specifically, kinds of such a polymer are described in various documents concerning liquid crystal cells or optical compensation sheets. Polyvinyl alcohols, modified polyvinyl alcohols, copolymers with polyacrylic acid or polyacrylate, polyvinyl pyrrolidone, cellulose and modified cellulose are preferably used. Materials used for producing the alignment layer may have a functional group capable of reacting with the reactive group of the liquid crystalline compound. Examples of the polymer having such a functional group include polymers comprising a repeating unit having such a functional group in the side chain, and polymers having a cyclic moiety substituted with such a functional group. It is more preferable to use an alignment layer capable of forming a chemical bond with the liquid-crystalline compound at the interface, and a particularly preferable example of such alignment layer is a modified polyvinyl alcohol, described in JP-A-9-152509, which has an acrylic group introduced in the side chain thereof using acid chloride or Karenz MOI (trade name, manufactured by Showa Denko K. K.). The thickness of the alignment layer is preferably 0.01 to 5 μm, and more preferably 0.05 to 2 μm. The alignment layer may function as an oxygen insulation layer.

Polyimide film which has been widely used as an alignment layer for LCD (preferably a layer composed of a fluorine-atom-containing polyimide) is also preferable as the organic alignment layer. The film may be formed by applying poly(amic acid), provided, for example, as LQ/LX series products by Hitachi Chemical Co., Ltd or as SE series products by NISSAN CHEMICAL INDUSTRIES, LTD, to a surface of the support, baking at 100 to 300° C. for 0.5 to one hour to form a polymer layer, and rubbing a surface of the polymer layer.

The rubbing treatment may be carried out with known techniques which have been employed in the usual step for aligning of liquid crystal of LCD. In particular, the rubbing treatment may be carried out by rubbing a surface of the alignment layer in a direction, with paper, gauze, felt, rubber, nylon or polyester fiber or the like. The rubbing treatment is generally carried out, for example, by rubbing for several times with a cloth having the same length and the same diameter fibers grafted uniformly.

Examples of a deposition material used in inorganic oblique vapor deposition film include metal oxides such as $SiO_2$, which is a typical material, $TiO_2$ and $ZnO$; fluorides such as $MgF_2$; metals such as Au and Al. Any high dielectric constant metal oxides can be used in oblique vapor deposition, and, thus, the examples thereof are not limited to the above mentioned materials. The inorganic oblique deposition film may be produced with a deposition apparatus. The deposition film may be formed by depositing on an immobile film (a support) or on a long film fed continuously.

[Reflective Layer]

The birefringent pattern builder may have a reflective layer for the purpose of producing more readily identifiable birefringence pattern. As the reflective layer, examples include, but not to be limited to, metal layer such as aluminum or silver.

[Post-Adhesive Layer]

The birefringent pattern builder may have a post-adhesive layer in order that the patterned birefringent product produced after the after-mentioned patterned light exposure and baking can be attached to another product. The material of the post-adhesive layer is not particularly limited, but preferred to be a material which has adhesiveness even after the baking step for production of the birefringence pattern.

[Two or More Optically Anisotropic Layers]

The birefringent pattern builder may have two or more optically anisotropic layers. The two or more optically anisotropic layers may be adjacent to each other in direction of the normal line, or may sandwich another functional layer. The two or more optically anisotropic layers may have almost the same retardation to each other, or different retardation to each other. The slow axes of them may be in the same direction to each other, or different direction to each other.

As an example wherein a birefringent pattern builder having two or more optically anisotropic layers laminated so that the slow axis of each is in the same direction is used, a case of preparing a pattern having large retardation can be mentioned. Even when the optically anisotropic layer at hand singly has insufficient retardation, a patterned optically anisotropic layer containing a region having large retardation can be readily obtained by laminating two or three layers and then conducting patterning.

[Method of Producing Birefringent Pattern Builder]

The method of producing the birefringent pattern builder is not particularly limited. For example, the birefringent pattern builder may be produced by: directly forming an optically anisotropic layer on a support; transferring an optically anisotropic layer on a support by using another birefringent pattern builder used as a transferring material; forming a self-supporting optically anisotropic layer; forming another functional layer on a self-supporting optically anisotropic layer; attaching a support to a self-supporting optically anisotropic layer; or the like. Among these, in view of avoiding limitation to the property of the optically anisotropic layer, a method of direct formation of an optically anisotropic layer on a support and a method of transfer of an optically anisotropic layer on a support by using a transferring material are preferred. Further, in view of avoiding limitation to the support, a method of transferring of an optically anisotropic layer on a support by using a transferring material is more preferred.

When a patterned birefringent product obtained from the birefringent pattern builder of the first embodiment of the present invention is a substrate for a liquid crystal display device, the number of production steps having a photo-sensitive resin layer for forming a difference in the level can be reduced by forming the substrate by the transferring material.

As the method for producing the birefringent pattern builder having two or more optically anisotropic layers, the birefringent pattern builder may be produced by, for example, directly forming an optically anisotropic layer on a different birefringent pattern builder; transferring an optically anisotropic layer on a birefringent pattern builder by using a different birefringent pattern builder as a transferring material. Among these, transfer of an optically anisotropic layer on a birefringent pattern builder by using another birefringent pattern builder as a transferring material is more preferable.

A birefringent pattern builder used as a transferring material will be explained in the followings. A birefringent pattern builder used as a transferring material may be referred to as "transferring material for producing a birefringence pattern" in the specification especially in the after-mentioned Examples.

[Temporary Support]

The birefringent pattern builder used as a transferring material is preferred to have a temporary support. The temporary support is not particularly limited and may be transparent or opaque.

Examples of the polymer, which can constitute a temporary support, include cellulose ester (for example, cellulose acetate, cellulose propionate, and cellulose butyrate), polyolefin (for example, norbornene based polymer), poly(meth)acrylate (for example, polymethylmethacrylate), polycarbonate, polyester, and polysulfone. For the purpose of optical property examination in a manufacturing process, the support is preferably selected from transparent and low-birefringence polymer films. Examples of the low-birefringence polymer films include cellulose ester films and norbornene based polymer films. Commercially available polymers such as a norbornene based polymer, "ARTON" provided by JSR and "ZEONEX" and "ZEONOR" provided by ZEON CORPORATION may be used. Polycarbonate, poly(ethylene terephthalate), or the like which is inexpensive, may also be preferably used.

[Adhesive Layer for Transfer]

The transferring material is preferred to have an adhesive layer for transfer. The adhesive layer for transfer is not particularly limited as far as the layer is transparent and non-colored, and has sufficient property for transfer. Examples include adhesive layer using an adhesive agent, a pressure-sensitive resin layer, a heat-sensitive resin layer, and a photo-sensitive resin layer. Among these, the heat-sensitive resin layer and the photo-sensitive resin layer are preferred in view of heat-resistance (resistance to baking).

[Photosensitive Resin Layer]

The photosensitive resin layer functions as an adhesive layer for transfer in a transferring material. When the birefringent pattern builder of the first embodiment of the present invention is used for a liquid crystal display device, the photosensitive resin layer functions as a layer for forming a difference in the level in the liquid crystal display device.

The photosensitive resin layer may be formed of a photosensitive resin composition, for which either of positive type and negative type is acceptable, and commercial resist material may also be used. When used as an adhesive layer for transfer, adhesiveness is preferably exhibited by light irradiation. For improvement of environmental safety and prevention of explosion in the production method, for example, for substrates for liquid crystal display devices, the photosensitive resin layer is preferably developed with an aqueous developing solution containing organic solvents in an amount of 5% or less, particularly preferably with an alkali developing solution.

The photosensitive resin layer is preferably formed of a resin composition comprising at least a polymer, a monomer or oligomer, and a photopolymerization initiator or photopolymerization initiator systems. With regard to the polymer, monomer or oligomer, and a photo-polymerization initiator or photo-polymerization initiator systems, the description in paragraph Nos. [0082] to [0085] of JP-A-2007-121986 can be referred to.

The photo-sensitive resin layer preferably includes appropriate surfactant from the view point of effectively preventing unevenness. With regard to surfactant, the description in [0095] to [0105] of JP-A-2007-121986 can be referred to.

The adhesive agent for the adhesive layer is preferred to exhibit, for example, good optical transparency, suitable wettability, and adhesive characteristics such as cohesiveness and adhesiveness. Specific examples are adhesive agents prepared using a suitable base polymer such as an acrylic polymer, silicone-based polymer, polyester, polyurethane, polyether, or synthetic rubber. The adhesive characteristics of the adhesive layer can be suitably controlled by conventionally known methods. These include adjusting the composition and/or molecular weight of the base polymer forming the adhesive layer, and adjusting the degree of crosslinking and/or the molecular weight thereof by means of the crosslinking method, the ratio of incorporation of crosslinking functional groups, and the crosslinking agent blending ratio.

The pressure-sensitive resin layer is not specifically limited as far as it exhibits adhesiveness when pressure is applied. Various adhesives, such as rubbers, acrylics, vinyl ethers, and silicones, can be employed as the pressure-sensitive adhesive. The adhesives may be employed in the manufacturing and coating stages in the form of solvent adhesives, non-water-based emulsion adhesives, water-based emulsion adhesives, water-soluble adhesives, hot melt adhesives, liquid hardening adhesives, delayed tack adhesives, and the like. Rubber adhesives are described in Shin Kobunshi Bunko 13 (the New Polymer Library 13), "Nenchaku Gijutu (Adhesion Techniques)," Kobunshi Kankokai (K.K.), p. 41 (1987). Examples of the vinyl ether adhesives include vinyl ether comprised mainly of alkyl vinyl ether compounds having 2 to 4 carbon atoms, and vinyl chloride/vinyl acetate copolymers, vinyl acetate polymers, polyvinyl butyrals, and the like, to which a plasticizer is admixed. With respect to the silicone adhesives, rubber siloxane can be used to impart film formation and condensation strength of the film, and resinous siloxane can be used to impart adhesiveness or tackiness.

The heat-sensitive resin layer is not specifically limited as far as it exhibits adhesiveness when heat is applied. Examples of the heat-sensitive adhesives include hot-melt compounds and thermoplastic resins. Examples of the hot-melt compounds include low molecular weight compounds in the form of thermoplastic resins such as polystyrene resin, acrylic resin, styrene-acrylic resin, polyester resin, and polyurethane resin; and various waxes in the form of vegetable waxes such as carnauba wax, Japan wax, candelilla wax, rice wax, and aucury wax; animal waxes such as beeswax, insect waxes, shellac, and whale wax; petroleum waxes such as paraffin wax, microcrystalline wax, polyethylene wax, Fischer-Tropshe wax, ester wax, and oxidized waxes; and mineral waxes such as montan wax, ozokerite, and ceresin wax. Further examples include rosin, hydrogenated rosin, polymerized rosin, rosin-modified glycerin, rosin-modified maleic acid resin, rosin-modified polyester resin, rosin-modified phenol resin, ester rubber, and other rosin derivatives; as well as phenol resin, terpene resin, ketone resin, cyclopentadiene resin, aromatic hydrocarbon resin, aliphatic hydrocarbon resin, and alicyclic hydrocarbon resin.

These hot-melt compounds preferably have a molecular weight of, usually 10,000 or less, particularly 5,000 or less, and a melting or softening point desirably falling within a range of 50° C. to 150° C. These hot-melt compounds may be used singly or in combinations of two or more. Examples of the above-mentioned thermoplastic resin include ethylene series copolymers, polyamide resins, polyester resins, polyurethane resins, polyolefin series resins, acrylic resins, and cellulose series resins. Among these, the ethylene series copolymers are preferably used.

[Dynamic Property Control Layer]

Between the temporary support and the optically anisotropic layer of the transferring material, a dynamic property control layer to control mechanical characteristics and conformity to irregularity may be preferably provided. The dynamic property control layer preferably exhibit flexible elasticity, is softened by heat, or fluidize by heat. A thermoplastic resin layer is particularly preferred for the dynamic property control layer. The component used in the thermoplastic resin layer is preferably an organic polymer substance described in JP-A-5-72724. The substance can be preferably selected from organic polymer substances having a softening point of about 80° C. or lower according to the Vicat method (specifically, the method of measuring a polymer softening point according to American Material Test Method ASTMD 1235). More specifically, examples include: a polyolefin such as polyethylene or polypropylene; an ethylene copolymer such as a copolymer of ethylene and vinyl acetate or a saponified product thereof; a copolymer of ethylene and an acrylate or a saponified product thereof; polyvinyl chloride; a vinyl chloride copolymer such as a copolymer of vinyl chloride and vinyl acetate or a saponified product thereof; a polyvinylidene chloride; a vinylidene chloride copolymer; polystyrene; a styrene copolymer such as a copolymer of styrene and a (meth)acrylate or a saponified product thereof; polyvinyl toluene; a vinyltoluene copolymer such as a copolymer of vinyltoluene and a (meth)acrylate or a saponified product thereof; a poly(meth)acrylate; a (meth)acrylate copolymer such as a copolymer of butyl(meth)acrylate and vinyl acetate; and a polyamide resin such as a vinyl acetate copolymer nylon, a copolymerized nylon, N-alkoxymethylated nylon, and N-dimethylaminated nylon.

[Intermediate Layer]

The transferring material preferably has an intermediate layer for the purpose of preventing mixing of the components during coating of a plurality of layers and during storage after the coating. The oxygen shut-off film having an oxygen shut-off function described as "separation layer" in JP-A-5-72724 or the above-described orientation layer for generating optical anisotropy is preferably used as the intermediate layer. Particularly preferably among them is a layer containing a mixture of polyvinylalcohol or polyvinylpyrrolidone and one or more derivatives thereof. One layer may work simultaneously as the above thermoplastic resin layer, oxygen shut-off layer, and alignment layer.

[Forming Method of Layer]

The individual layers of the optically anisotropic layer, photosensitive resin layer, adhesive layer for transfer, adhesive layer, and optionally-formed alignment layer, thermoplastic resin layer, dynamic property control layer, and intermediate layer can be formed by coating such as dip coating, air knife coating, spin coating, slit coating, curtain coating, roller coating, wire bar coating, gravure coating and extrusion coating (U.S. Pat. No. 2,681,294). Two or more layers may be coated simultaneously. Methods of simultaneous coating is described in U.S. Pat. Nos. 2,761,791, 2,941,898, 3,508,947, 3,526,528, and in "Kotingu Kogaku (Coating Engineering)", written by Yuji Harazaki, p. 253, published by Asakura Shoten (1973).

When the layer immediately above the optically anisotropic layer (for example, the adhesive layer for transfer) is applied to the optically anisotropic layer, the coating liquid may be added with a plasticizer or a photopolymerization initiator. Thereby, the modification of the layer may be conducted simultaneously by penetration of these additives.

[Transferring Method of Transferring Material to Target Material of Transfer]

Methods of transferring the transferring material on a target material of transfer are not specifically limited, so far as the optically anisotropic layer can be transferred onto the target material of transfer such as a support (substrate). For example, the transferring material in a film form may be attached so that the surface of the adhesive layer for transfer is faced to the surface of the target material of transfer, then pressing under heating or no-heating with rollers or flat plates, which are heated and/or pressed by a laminator. Specific examples of the laminator and the method of lamination include those described in JP-A-7-110575, JP-A-11-77942, JP-A-2000-334836 and JP-A-2002-148794, wherein the method described in JP-A-7-110575 is preferable in terms of low contamination.

Examples of the target material of transfer include a support, a laminated structure which is comprised of a support and another functional layer, and a birefringent pattern builder.

[Steps Included in Transfer]

The temporary support may be separated or not be separated after the transfer of a birefringent pattern builder on the target material of transfer. When the temporary support is not separated, the temporary support preferably has transparency suited for the patterned light exposure afterwards and heat-resistance sufficient for surviving the baking step. A step for removing unwanted layers which has been transferred with the optically anisotropic layer may be included in the method. For example, when polyvinyl alcohol/polyvinylpyrrolidone copolymer is used in the alignment layer, the alignment layer and the layers above can be removed by development with an aqueous weak alkaline developing solution. Methods of the development may be any of known methods such as paddle development, shower development, shower-and-spin development and dipping development. The temperature of the developing solution is preferably 20° C. to 40° C., and pH of the developing solution is preferably 8 to 13.

Other layer (e.g. electrode layer) may be formed on the surface remained after the separation of the temporary support or the removal of the unwanted layers, according to need. Another transferring material may be transferred on the surface remained after the separation of the temporary support or the removal of the unwanted layers, according to need. The transferring material may be the same or different from the previously transferred transferring material. Further, the slow axis of the optically anisotropic layer in the first transferred transferring material may be in the same or different direction from that of the slow axis of the optically anisotropic layer in the second transferred transferring material. As described above, transferring plural optically anisotropic layers is useful for production of a birefringence pattern having large retardation with plural optically anisotropic layers stacked so that the directions of the slow axes are the same, and a specific birefringence pattern with plural optically anisotropic layers stacked so that the directions of the slow axes are different to each other.

[Production of Patterned Birefringent Product]

By conducting the method including a step of using the birefringent pattern builder to conduct a pattern-like heat treatment or irradiation of ionizing radiation and a step of causing the remaining unreacted reactive group in the optically anisotropic layer to react or deactivate in this order, a patterned birefringent product can be produced. In particular, when the optically anisotropic layer has a retardation disappearance temperature and the retardation disappearance temperature increases by the irradiation of ionizing radiation (or the heat treatment at a temperature equal to or lower than the retardation disappearance temperature), a patterned birefringent product can be produced easily.

The pattern-like irradiation of ionizing radiation may be, for example, exposure to light (patterned light exposure). The patterned light exposure is conducted to cause an unreacted reactive group in the optically anisotropic layer to react and this causes an exposed region to have an increased retardation disappearance temperature. Thereafter, a step of causing the remaining unreacted reactive group in the optically anisotropic layer to react or deactivate is conducted at a temperature higher than the retardation disappearance temperature of the not-exposed region and lower than the retardation disappearance temperature of the exposed region. As a result, only the retardation of the not-exposed region can be selectively caused to disappear to thereby form a birefringent pattern. The step of causing a remaining unreacted reactive group in the optically anisotropic layer to react or deactivate may be an overall exposure or an overall heat treatment (baking) if the reactive group also can be caused to react by heat. For saving cost, the heating at a temperature higher than the retardation disappearance temperature of the not-exposed region and lower than the retardation disappearance temperature of the exposed region also can preferably provide a heat treatment for reaction.

The pattern-like heat treatment also may be conducted by another method as described below. In this method, a region is firstly heated at a temperature close to the retardation disappearance temperature to reduce or disappear the retardation. Thereafter, the step of causing a remaining unreacted reactive group in the optically anisotropic layer to react or deactivate (overall exposure or overall heating) at a temperature lower than the retardation disappearance temperature to thereby obtain a birefringent pattern. In this case, a pattern can be obtained in which the retardation of only the firstly-heated region is lost.

[Timing of Transfer]

When the transfer is conducted in the production of the birefringent pattern of the present invention, the timing of the transfer is arbitrary. Specifically, when the transfer is conducted in the production of a birefringent pattern including, for example, at least the following steps of in this order:

coating and drying a solution containing a liquid crystalline compound;

causing one kind of the reactive groups to react by applying heat or irradiating ionizing radiation;

conducting heat treatment or irradiation of ionizing radiation again to react reactive groups including reactive groups different from the one reacted in the above step; and causing an unreacted reactive group remaining in the optically anisotropic layer to react or deactivate (e.g., baking at a temperature of 50° C. or more and 400° C. or less), the transfer may be conducted immediately after the step of coating and drying a solution containing a liquid crystalline compound, after the step of causing one kind of the reactive groups to react by applying heat or irradiating ionizing radiation, or immediately before or after the step of causing the remaining unreacted reactive group to react or deactivate.

In this case, depending on the timing of the transfer, a material to be used may be limited. When the transfer is conducted immediately after the coating and drying for example, the material must be made of a liquid crystalline compound that can endure the transfer while being in an unreacted status. When the baking is conducted as the step of causing the remaining unreacted reactive group to react or deactivate and then the transfer is conducted for example, a material to be used as a temporary support until the transfer must be a material that can endure the baking. From the viewpoint of enabling the use of materials in a wide range, the transfer is preferably conducted after the step of causing one kind of the reactive groups to react by applying heat or irradiating ionizing radiation.

[Timing of Pattern Formation]

In the production of the birefringent pattern of the present invention, the pattern-like heat treatment or irradiation of ionizing radiation may be conducted at any of the step of conducting heat treatment or irradiation of ionizing radiation. Specifically, for example, in the production of the birefringent pattern containing at least the following steps of in this order:

coating and drying a solution containing a liquid crystalline compound;

causing one kind of the reactive groups to react by applying heat or irradiating ionizing radiation; and conducting heat treatment or irradiation of ionizing radiation again to react reactive groups including reactive groups different from the one reacted in the above step, the step of causing one kind of the reactive groups to react by applying heat or irradiating ionizing radiation may be conducted in a patterned manner, the step of conducting heat treatment or irradiation of ionizing radiation again to react reactive groups including reactive groups different from the one reacted in the above step may be conducted in a patterned mariner, or both of the steps also may be conducted in a patterned manner.

On the other hand, when the transfer is conducted in the production of the birefringent pattern, a material to be used may be limited depending on the timing at which the pattern-like heat treatment or irradiation of ionizing radiation is conducted. When the step of causing one kind of the reactive groups to react by applying heat or irradiating ionizing radiation is conducted in a patterned manner and the transfer is conducted immediately thereafter for example, the material must be made of a liquid crystalline compound that can endure the transfer while an unreacted region exists. From the viewpoint of enabling the use of materials in a wide range, when the transfer is conducted in the middle of the production of the birefringent pattern, a not-pattern-like heat treatment or irradiation of ionizing radiation is preferably conducted prior to the transfer.

On the other hand, when it is desired that the transfer is followed by the formation of a pattern in accordance with the shape of the base material after the transfer or the base, it is preferred that the step of causing one kind of the reactive groups to react by applying heat or irradiating ionizing radiation is firstly conducted in a not-patterned manner (=overall) and then the transfer is conducted, after which the step of conducting heat treatment or irradiation of ionizing radiation again to react reactive groups including reactive groups different from the one reacted in the above step is conducted in a patterned manner. Such a case will be described below.

First, the production of a birefringent pattern by a pattern-like exposure and an overall heat treatment or an overall exposure at a temperature equal to or higher than the retardation disappearance temperature will be described in detail.

[Patterned Light Exposure]

The patterned light exposure for producing a birefringent pattern may be conducted so as to form only an exposed region and a not-exposed region so that a region in the birefringent pattern builder in which birefringence properties are desired to be left is exposed. Alternatively, exposures based on different exposure conditions also may be conducted in a patterned manner. An optically anisotropic layer in the exposed region has an increased retardation disappearance temperature.

The method of patterned light exposure may be a contact light exposure using a mask, proximity light exposure, projected light exposure, or direct drawing by focusing on the predetermined point by using laser or electron beam without a mask. The irradiation wavelength of the light source for the light exposure preferably has a peak in the range of 250 to 450 nm, and more preferably in the range of 300 to 410 nm. When a photosensitive resin layer is used to form different levels (unevenness) at the same time, it is also preferred that light in a wavelength region at which the resin layer can be cured (e.g., 365 nm, 405 nm) is irradiated to the resin layer. Specific examples of the light source include extra-high voltage mercury lamp, high voltage mercury lamp, metal halide lamp, and blue laser. Energy of exposure generally falls in the range preferably from about 3 $mJ/cm^2$ to about 2,000 $mJ/cm^2$, more preferably from about 5 $mJ/cm^2$ to about 1,000 $mJ/cm^2$, and further preferably from about 10 $mJ/cm^2$ to about 500 $mJ/cm^2$.

Examples of the parameters of the exposure conditions include, but are not particularly limited thereto, exposure peak wavelength, exposure intensity, exposure time period, exposure quantity, exposure temperature, exposure atmosphere, and the like. Among them, exposure peak wavelength, exposure intensity, exposure time period, and exposure quantity are preferable, and exposure intensity, exposure time period, and exposure quantity are more preferable, from the viewpoints of convenience in adjusting the conditions. The pattern exposure may be performed by a plurality of exposures, or by single exposure by using, for example, a mask having two or more regions having transmission spectra different from each other, or alternatively by exposure in combination thereof. The expression that the light exposure having different exposure conditions are conducted in a patterned manner means that the light exposure is conducted so that two or more exposure regions exposed under different exposure conditions are generated.

[Reaction Processing by Overall Heat Treatment (Baking) or Overall Exposure at Temperature Equal to or Higher than Retardation Disappearance Temperature]

In order that the birefringent pattern builder subjected to the patterned light exposure is processed so the not-exposed region has a reduced retardation while retaining the retardation of the exposed region and in order to cause the remaining unreacted reactive groups to react or deactivate while this status is being maintained to thereby obtain a stable birefringent pattern, an overall heat treatment or an overall exposure at a temperature equal to or higher than the retardation disappearance temperature of the not-exposed region is preferably conducted.

When the processing is conducted by an overall heat treatment, although temperature conditions change depending on the material, the processing is preferably performed at a temperature equal to or higher than the retardation disappearance temperature of the not-exposed region and equal to or lower than the retardation disappearance temperature of the exposed region. Further, the temperature is also preferably a temperature that efficiently promotes the reaction or deactivation of the unreacted reactive group. Specifically, although not particularly limited, a heat treatment at about 50 to 400° C. is preferred, a heat treatment at about 100 to 260° C. is more preferred, a heat treatment at about 150 to 250° C. is further preferred, and a heat treatment at about 180 to 230° C. is particularly preferred. However, a suitable temperature changes depending on required birefringence properties (retardation) or the thermal curing reactivity of the optically anisotropic layer to be used. The heat treatment also can be expected to provide an effect of evaporating or burning unnecessary components in the material. Although the time of the heat treatment is not particularly limited, the time of 1 minute or more and 5 hours or less is preferred, the time of 3 minutes or more and 3 hours or less is more preferred, and the time of 5 minutes or more and 2 hours or less is particularly preferred.

When a temperature equal to or lower than the retardation disappearance temperature of the exposed region causes an insufficient reactivity of an unreacted reactive group to thereby suppress the reaction processing from progressing sufficiently for example, it is also useful to conduct an overall exposure while maintaining a temperature equal to or higher than the retardation disappearance temperature of the not-exposed region. In this case, a preferred light source is the same as that described in the patterned light exposure. An exposure amount is generally preferably about 3 to 2,000 mJ/cm$^2$, more preferably about 5 to 1,000 mJ/cm$^2$, further preferably about 10 to 500 mJ/cm$^2$, and most preferably about 10 to 300 mJ/cm$^2$.

Further, the method of the present invention may be combined with the steps, in which another transferring material for producing birefringence pattern builder is transferred on the laminated structure obtained by conducting patterned light exposure to a birefringence pattern builder, and then another patterned light exposure is conducted. The retardation values retained after baking can be effectively changed among the region which is a non-light-exposed region both in the first and second exposures (generally having the lowest retardation value), the region which is a light-exposed region in the first exposure but a non-light-exposed region in the second exposure, and the region which is a light-exposed region both in the first and second exposures (generally having the highest retardation value). On the other hand, the region which is unexposed at the first time but is exposed at the second time is considered to be equal, upon the second time, to the region which is exposed at both the first and second times. In a similar manner, four or more regions can be readily formed, by conducting transfer and patterned light exposure alternately three, four or more times.

[Overall Heat Treatment (Baking)]

Birefringence pattern can be produced by applying heat to the birefringence pattern builder after patterned light exposure at 50 to 400° C., preferably 80 to 400° C. When the retardation disappearance temperature of the optically anisotropic layer in the birefringence pattern builder used for forming birefringence pattern before the light exposure is referred to as T1 (° C.), and the retardation disappearance temperature after the light exposure as T2 (° C.), (provided that when the retardation disappearance temperature is not in the range of the temperature of 250° C. or lower, T2=250), the temperature of baking is preferably T1° C. or higher and T2° C. or lower, more preferably (T1+10)° C. or higher and (T2−5)° C. or lower, and most preferably (T1+20)° C. or higher and (T2-10)° C. or lower.

By baking, the retardation in the non-light exposed region in the birefringence pattern builder lowers, whereas the retardation in the light exposed region, in which retardation disappearance temperature has risen by the previous patterned light exposure, lowers only slightly, absolutely does not lower, or rises. As a result, the retardation in the non-light exposed region is smaller than that in the light exposed region, enabling production of birefringence pattern (a patterned optically anisotropic layer).

Alternatively, another transferring material for producing birefringence pattern builder may be transferred on the birefringence pattern builder which has been baked, and then a patterned light exposure and baking may be conducted thereon. In this case, the retardation values after the second baking can be effectively changed between the region which is non-light-exposed region both in the first and second exposure, the region which is light-exposed region in the first exposure and non-light-exposed region in the second exposure, the region which is a non-light-exposed region in the first exposure and light-exposed region in the second exposure (the retardation of the non-light-exposed region in the first exposure already disappears due to the baking), and the region which is light-exposed region both in the first and second exposure. This method is useful when two regions having birefringence of different slow-axis directions to each other are needed to be formed without overlap to each other.

Next, the pattern-like reduction of retardation by a pattern-like heat treatment and the production of a birefringent pattern by an overall heat treatment or an overall light exposure at a temperature equal to or lower than the retardation disappearance temperature will be described in detail.

[Pattern-Like Heat Treatment (Writing of Heat Pattern)]

The heating temperature at the time of heating of a local region of the birefringent pattern builder is not limited and may be any temperature so long as the temperature causes a heated part and a non-heated part to have different retardations. When a heated part desirably has retardation of substantially 0 nm in particular, it is preferred to conduct the heating at a temperature equal to or higher than the retardation disappearance temperature of the optically anisotropic layer of the birefringent pattern builder used. On the other hand, the heating temperature is preferably lower than a temperature at which the optically anisotropic layer is burned or colored. The heating may be generally performed at a temperature in a range from about 120° C. to about 260° C., more preferably in a range from 150° C. to 250° C., and further preferably in a range from 180° C. to 230° C.

Although the method of heating a part (region) of a birefringent pattern builder is not particularly limited, such methods may be used including a method of causing a heating body to have a contact with a birefringent pattern builder, a method of providing or placing a heating body in the close vicinity of a birefringent pattern builder, and a method of using a heat mode exposure to partially heat a birefringent pattern builder.

[Reaction Processing by Overall Heat Treatment (Baking) or Overall Exposure at Temperature Equal to or Lower than Retardation Disappearance Temperature]

A region that is in an optically anisotropic layer subjected to the pattern-like heat treatment and not subjected to a heat treatment still includes an unreacted reactive group while retaining the retardation, and thus is still in an unstable status. In order to react or deactivate the unreacted reactive group remaining in the not-treated region, a reaction processing by an overall heat treatment or an overall exposure is preferably conducted.

The reaction processing by an overall heat treatment is conducted preferably at a temperature lower than the retardation disappearance temperature of an optically anisotropic layer of the birefringent pattern builder used that efficiently promotes the reaction or deactivation of the unreacted reactive group. Generally, the heating at about 120 to 180° C. may be conducted, 130 to 170° C. is more preferred, and 140 to 160° C. is further preferred. However, a suitable temperature changes depending on required birefringence properties (retardation) or the thermal curing reactivity of an optically anisotropic layer used. The time of the heat treatment is not particularly limited. The time of the heat treatment is preferably 1 minute or more and 5 hours or less, the time of 3 minutes or more and 3 hours or less is more preferred, and the time of 5 minutes or more and 2 hours or less is particularly preferred.

The reaction processing also can be conduced by an overall exposure instead of the overall heat treatment. In this case, the irradiation wavelength of a light source preferably has a peak in a range from 250 to 450 nm and more preferably in a range from 300 to 410 nm. When the photo-sensitive resin layer is used to form different levels at the same time, irradiation of light having a wavelength region at which the resin layer can be cured (e.g., 365 nm, 405 nm) is also preferred. Specific examples of the light source include extra-high-pressure mercury lamp, high-pressure mercury lamp, metal halide lamp, and blue laser. Exposure amount generally falls in the range preferably from about 3 mJ/$cm^2$ to about 2,000 mJ/$cm^2$, more preferably from about 5 mJ/$cm^2$ to about 1,000 mJ/$cm^2$, further preferably from about 10 mJ/$cm^2$ to about 500 mJ/$cm^2$, and most preferably from about 10 mJ/$cm^2$ to about 300 mJ/$cm^2$.

[Finishing Heat Treatment]

When the birefringent pattern produced by the steps according to the preceding sections is desired to have a further-improved stability, a finishing heat treatment also may be performed for the purpose of further reacting unreacted reactive groups still remaining after the fixing to increase the durability, and for the purpose of evaporating or burning an unnecessary component in the material to remove such a component. In particular, the finishing heat treatment is effective when a birefringent pattern is produced by a patterned light exposure and a heating overall exposure or by a pattern-like heat treatment and an overall exposure. The finishing heat treatment may be performed at a temperature from about 180 to about 300° C., more preferably from 190 to 260° C., and further preferably from 200 to 240° C. The time of the heat treatment is not particularly limited. However, the time of the heat treatment is preferably 1 minute or more and 5 hours or less, more preferably 3 minutes or more and 3 hours or less, and particularly preferably 5 minutes or more and 2 hours or less.

[Patterned Birefringent Product]

The patterned birefringent product obtained by subjecting the birefringent pattern builder to the light exposure and baking as described above is generally colorless and transparent; and when there is a reflective layer, it only shows the color thereof, and when it is sandwiched between two polarizing filters (polarizing plates) or between a reflective layer and a polarizing filter (polarizing plate), the product exhibits characteristic contrast or color, and becomes readily identifiable with the naked eye. Using this property, the patterned birefringent product obtained by the above method can be used as, for example, means for preventing forgery. That is, the patterned birefringent product obtained by the method of the present invention, especially the patterned birefringent product having a reflective layer is normally almost invisible with the naked eye, whereas, through a polarizing plate, the patterned birefringent product can exhibit multi-colored image which can be readily identified. A photocopy of the birefringence pattern taken without any polarizing plate exhibits no image, whereas a photocopy through a polarizing plate exhibits a permanent pattern which is visible with the naked eye without using any polarizing plate. Therefore, the reproduction of the birefringence pattern is difficult. Such kind of method of producing birefringence pattern is not widely spread, and needs unusual or special kind of material. Therefore, the production method and product of the present invention can be considered to be favorably adapted as means of preventing forgery. Further, by combining or laminating the patterned birefringent product in combination with an embossed hologram, a Lipman hologram, an IC tag or the like, the forgery prevention level also can be improved or the patterned birefringent product also can be combined with rewritable information.

[Optical Element]

The patterned birefringent product obtained by the above method can be also used as an optical element. For example, when the patterned birefringent product obtained by the above method is used as a structural optical element, a particular optical element which exhibit effects only against a specific polarized light can be produced. As an example, a diffraction grating produced with the birefringence pattern according to the present invention functions as a polarization separation device which strongly diffracts a specific polarized light, and can be applied to as a projector or an optical communication device.

[Functional Layer to be Laminated on Birefringence Pattern]

The birefringent pattern builder may be processed as described in the above to obtain birefringence pattern, which can be then laminated with functional layers with various functions to thereby obtain a patterned birefringent product. Examples of the functional layer include, but not specifically limited to, hardcoat layer for preventing damage or scratches on the surface, and reflective layer which renders the birefringence pattern readily visible. For an easy identification of the pattern, a reflective layer is particularly preferred to be provided under the birefringence pattern.

[Method of Manufacturing Laminated Structure Material Having Birefringent Pattern]

The laminated structure material of the second embodiment of the present invention can be formed by providing an optical stress-sensitive layer for visualizing the peeling with the birefringent pattern produced in the manner as described above. The laminated structure material of the present invention also may have an adhesive layer to be adhered to a product as required. Alternatively, the optical stress-sensitive layer also may function as an adhesive layer.

[Adhesive Layer]

A material for forming the adhesive layer is not particularly limited so long as the material does not alter or danger an aluminum foil. For example, an adhesive layer can be formed that is made by optionally adding an adhesive component (e.g., the butyl rubber-base, natural rubber-base, silicon-base, or polyisobutyl-base one), an aggregating component (e.g., alkyl methacrylate, vinyl ester, acrylonitrile, styrene, vinyl monomer), a reforming component or a polymerization initiator (e.g., unsaturated carboxylic acid, a hydroxyl group-containing monomer, acrylonitrile), and additives (e.g., plasticizer, curing agent, hardening accelerator, antioxidant). Specifically, an adhesive layer may be the one obtained by adding spheral particles to an adhesive agent (e.g., trade name: B-7589, manufactured by NIPPON CARBIDE INDUSTIRES, CO., INC.), the one obtained by adding a curing agent to an adhesive agent (e.g., one obtained by emulsifying an acryl resin having a low glass transition temperature such as 2-ethylhexyl acrylate), for example.

When the laminated structure material of the present invention having no adhesive layer is adhered to a product, the same composition as that for forming the above adhesive layer may be used as the adhesive agent. Alternatively, commercially-available adhesive agent also may be appropriately selected and used.

[Patterned Adhesive Layer]

The adhesive layer also may be a patterned adhesive layer having regions having adhesive strength different from each other to thereby function as an optical stress-sensitive layer. By providing the patterned adhesive layer, a brittle laminated structure material can be formed that changes by the peeling (e.g., the birefringent pattern deforms) or in which the birefringent pattern is broken. The patterned adhesive layer may be formed by selecting two or more kinds of compositions having adhesive strength different from each other from the compositions for forming the adhesive layer to be formed as described above. The adhesive strength of the composition can be adjusted by an adhesive component or the concentration of an adhesive component, for example. The patterned adhesive layer preferably has the maximum adhesive strength stronger than a force required to break the reflective layer and the minimum adhesive strength weaker than the force required to break the reflective layer.

The patterned adhesive layer also may function as a layer exhibiting an optical anisotropy by applying stress.

A case also may be considered where, when the patterned adhesive layer is processed by a selected delaminating agent, the laminated structure material is peeled without exhibiting the effect of detecting the peeling (e.g., breakage of the reflective layer). To prevent this, when a delaminating agent can be expected that has a delaminating action to a composition for forming an adhesive layer selected to form a patterned adhesive layer, a layer that swells, when having a contact with a component contained in the delaminating agent (e.g., organic solvent), to cause a change in the birefringence or whiting or yellowing, for example, is preferably provided with the laminated structure material.

[Delamination Layer]

By combining an adhesive layer and a delamination layer, an optical stress-sensitive layer having regions having different adhesive strength different from each other also can be obtained. Specifically, by providing a pattern-like delamination layer on an adhesive layer to thereby allow the adhesive layer to have thereon a part in which the delamination layer is formed and a part in which the delamination layer is not formed, a difference in the adhesive strength also can be provided to deform a latent image by the birefringent pattern.

The delamination layer may be provided at any of the birefringent pattern-side or a side at which the laminated structure material is adhered to a product when seeing from the adhesive layer. The delamination layer is preferably provided at the birefringent pattern-side. Further, the delamination layer and the adhesive layer are preferably contacted with each other.

A material for forming the delamination layer include, for example, a resin having a poor adhesiveness with an aluminum foil (e.g., acryl resin, chlorinated rubber-base resin, vinyl chloride-vinyl acetate copolymer resin, cellulose-base resin, chlorinated propylene resin, or silicone resin), resin obtained by mixing them with silicon oil, fatty acid amide, or zinc stearate, or brittle resin mixed with a large amount of inorganic filler or the like.

The birefringent pattern builder used as a transferring material may include a non-patterned delamination layer on the temporary support. The delamination layer controls the adhesion between the temporary support and the delamination layer or between the delamination layer and the layer laminated immediately above, and takes a role of helping the separation of the temporary support after the transfer of the optically anisotropic layer. The above-mentioned other functional layers such as the alignment layer and the dynamic property control layer may function as the delamination layer.

[Layer Exhibiting Optical Anisotropy by Applying Stress]

A layer exhibiting an optical anisotropy by applying stress may be, for example, a layer that exhibits birefringence when stress is applied thereto (e.g., stretching by a pulling operation during the separation or photoelasticity) and still exhibits birefringence after the separation, or a layer that deforms, when stress is applied thereto, to have a different shape to thereby cause a change in a visually-recognized light path.

Materials and production methods for the layer exhibiting an optical anisotropy when stress is applied thereto are not particularly limited. A position at which the layer exhibiting an optical anisotropy when stress is applied thereto is provided is not particularly limited so long as the position allows the layer to exhibit an optical anisotropy when stress is applied thereto due to the separation and the position can have an influence on a latent image given by the birefringent pattern after the separation. The layer exhibiting an optical anisotropy when stress is applied thereto is preferably provided at a position in the vicinity of the patterned optically anisotropic layer, and in particular in adjacent to the patterned optically anisotropic layer. The layer exhibiting an optical anisotropy when stress is applied thereto is also preferably provided not at the visually-recognized side but at the support side at which a large stress tends to be caused by the separation operation.

The layer exhibiting an optical anisotropy when stress is applied thereto may be provided on the birefringent pattern produced in the manner as described above. On the provided layer exhibiting an optical anisotropy when stress is applied thereto, a reflective layer or a support having a reflection function and an adhesive layer can be optionally provided.

The layer exhibiting an optical anisotropy when stress is applied thereto is also preferably provided, as shown in FIG. 1(j), FIG. 1(k), and FIG. 2(g), at such a position in the birefringent pattern builder that is adjacent to the optically anisotropic layer. The reason is that it is easier to provide the layer at a position adjacent to the patterned optically anisotropic layer. In this case, the layer must be the one for which the property exhibiting an optical anisotropy when stress is applied thereto does not disappear due to a processing in a step of producing a patterned optically anisotropic layer.

[Surface Protecting Layer]

A thin surface protecting layer (protective film) is preferably provided on the resin layer, such as the adhesive layer, for protecting the above layers against contamination or damage upon storage. The property of the surface protecting layer is not particularly limited and the surface protecting layer may be formed of the same or a similar material to that of the temporary support. The surface protecting layer should be readily separated from the layer adjacent thereto (for example an adhesive layer). As the material for the surface protecting layer, PET (polyethylene terephthalate), silicon paper, polyolefin, or polytetrafluoroethylene sheet is suitable.

[Product to which Laminated Structure Material is Adhered]

A product to which the laminated structure material of the second embodiment of the present invention is adhered is not particularly limited, and may be, for example, an ink jet cartridge.

A laminated structure material having a reflective layer is preferred because this structure can be adhered to many products and can realize the visualization of a latent image by a single polarizing plate.

A laminated structure material produced not to have a reflective layer can be used by being adhered to a transparent product. In the laminated structure material produced not to have a reflective layer, a birefringent pattern is preferably designed in a manner that two polarizing plates superposed so that the absorption axes are substantially orthogonal to each other sandwich the laminated structure material to visualize a latent image.

According to the present invention, it is possible to provide a material useful for easily producing a birefringent pattern. The birefringent pattern builder of the first embodiment of the present invention has a film-like shape by which transfer or adhesion can be realized and also has a required pattern property.

According to the present invention, it is possible to provide a laminated structure material having a birefringent pattern that is difficult to use the pattern for another product. The laminated structure material of the second embodiment of the present invention is useful as a seal for preventing forgery.

The laminated structure material of the present invention is high in resolution, is superior in heat resistance, provide an authentication image difficult in forgery, and is difficult to use the pattern for another product.

The present invention will be described in more detail based on the following examples. Any materials, reagents, amount and ratio of use and operations, as shown in the examples, may appropriately be modified without departing from the spirit and scope of the present invention. It is therefore understood that the present invention is by no means intended to be limited to the specific examples below.

EXAMPLES

Example 1

Production of Birefringent Pattern Builder Suitable for Transfer (Preparation of Coating Liquid CU-1 for Dynamic Property Control Layer (Thermoplastic Resin Layer))

The composition below was prepared, filtered through a polypropylene filter having a pore size of 30 μm, and the filtrate was used as a coating liquid CU-1 for forming a dynamic property control layer.

B-1 was a copolymer of methyl methacrylate, 2-ethylhexyl acrylate, benzyl methacrylate and methacrylic acid, having a copolymerization composition ratio (molar ratio) of 55/30/10/5, a weight-average molecular mass of 100,000, and a Tg of about 70° C.

B-2 was a copolymer of styrene and acrylic acid having a copolymerization composition ratio (molar ratio) of 65/35, a weight-average molecular mass of 10,000, and a Tg of about 100° C.

| Composition of Coating Liquid for Dynamic Property Control Layer (mass %) | |
|---|---|
| Binder (B-1) | 5.89 |
| Binder (B-2) | 13.74 |
| BPE-500 (trade name, manufactured by Shin-Nakamura Chemical Co., Ltd. | 9.20 |
| Megafac F-780-F (trade name, manufactured by Dainippon Ink & Chemicals Incorporation) | 0.55 |
| Methanol | 11.22 |
| Propylene glycol monomethyl ether acetate | 6.43 |
| Methyl ethyl ketone | 52.97 |

(Preparation of Coating Liquid AL-1 for Alignment Layer)

The composition below was prepared, filtered through a polypropylene filter having a pore size of 30 μm, and the filtrate was used as a coating liquid AL-1 for forming an alignment layer.

| Composition of Coating Liquid for Alignment layer (mass %) | |
|---|---|
| Polyvinyl alcohol (trade name: PVA205, manufactured by Kuraray Co., Ltd.) | 3.21 |
| Polyvinylpyrrolidone (trade name: Luvitec K30, manufactured by BASF) | 1.48 |
| Distilled water | 52.10 |
| Methanol | 43.21 |

(Preparation of Coating Liquid LC-1 for Optically Anisotropic Layer)

The composition below was prepared, filtered through a polypropylene filter having a pore size of 0.2 μm, and the filtrate was used as coating liquid LC-1 for forming an optically anisotropic layer.

LC-1-1 is a liquid crystalline compound having two reactive groups, one of which is acrylic group, i.e. a radically reactive group, and the other of which is oxetanyl group, i.e. a cationically reactive group.

LC-1-2 is a disk-shaped compound added for the purpose of orientation control. LC-1-2 was synthesized according to the method described in Tetrahedron Lett., Vol. 43, p. 6793 (2002).

| Composition of Coating Liquid for Optically Anisotropic Layer (%) | |
|---|---|
| Rod-like liquid crystal (LC-1-1) | 32.59 |
| Horizontal orientation agent (LC-1-2) | 0.02 |
| Cationic photopolymerization initiator (trade name: CPI100-P, manufactured by SAN-APRO Co., Ltd.) | 0.66 |
| Polymerization control agent (trade name: IRGANOX1076, manufactured by Chiba Speciality Chemicals Co., Ltd.) | 0.07 |
| Methyl ethyl ketone | 66.66 |

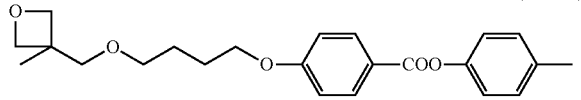

(LC-1-1)

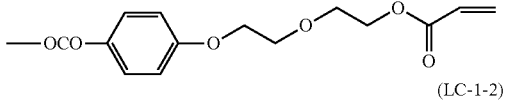

(LC-1-2)

Composition of Coating Liquid for Optically Anisotropic Layer (%)

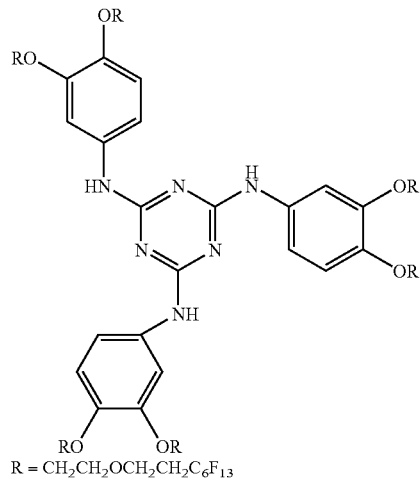

$R = CH_2CH_2OCH_2CH_2C_6F_{13}$ (Preparation of Coating Liquid AD-1 for Adhesive Layer for Transfer)

The composition below was prepared, filtered through a polypropylene filter having a pore size of 0.2 µm, and the filtrate was used as coating liquid AD-1 for forming an adhesive layer for transfer.

B-3 was a copolymer of benzyl methacrylate, methacrylic acid, and methyl methacrylate, having a copolymerization composition ratio (molar ratio) of 35.9/22.4/41.7, and a weight-average molecular mass of 38,000.

As RPI-1,2-trichloromethyl-5-(p-styrylstyryl)1,3,4-oxadiazole was used.

| Composition of Coating Liquid for Adhesive Layer for Transfer (mass %) | |
|---|---|
| Binder (B-3) | 8.05 |
| KAYARAD DPHA (trade name, manufactured by Nippon Kayaku) | 4.83 |
| Radical polymerization initiator (RPI-1) | 0.12 |
| Hydroquinone monomethyl ether | 0.002 |
| Megafac F-176PF (trade name, manufactured by Dainippon Ink & Chemicals Incorporation) | 0.05 |
| Propylene glycol monomethyl ether acetate | 34.80 |
| Methyl ethyl ketone | 50.538 |
| Methanol | 1.61 |

(Production of Transfer Use-Type Birefringent Pattern Builder BPM-1)

To the surface of a temporary support formed of a 75-µm-thick polyethylene terephthalate film, the coating liquid for a dynamic property control layer, CU-1, and the coating liquid for an alignment layer, AL-1, in this order were applied by using a wire bar coater and dried. The obtained layers had dry film thickness of 14.6 µm and 1.6 µm, respectively. Next, the coating liquid for optically anisotropic layer, LC-1, was applied to the surface using a wire bar coater, dried under heating at 90° C. on the surface of the film for 2 minutes, to thereby obtain a layer of a liquid crystal phase. The coated layer was then illuminated in the air atmosphere by ultraviolet radiation by using a 160 mW/cm², air-cooled metal halide lamp (product of Eyegraphics Co., Ltd.), so as to fix the alignment state of the phase to thereby obtain a 3.5-µm-thick optically anisotropic layer. The ultraviolet ray used was 100 mW/cm² illuminance in the range of UV-A (integrated value in the wavelength between 320 nm and 400 nm), and 80 mJ/cm² irradiation energy in the range of UV-A. Finally, the coating liquid for adhesive layer for transfer, AD-1, was applied to the optically anisotropic layer, dried to obtain an adhesive layer for transfer of 1.2-µm-thick, which was then pressure-bonded with a protective film (a 12-µm-thick polypropylene film), to thereby obtain a birefringent pattern builder BPM-1.

The produced birefringent pattern builder BPM-1 is a film sample capable of being stored at an ordinary temperature and pressure for a long time. In addition, it could transfer the optically anisotropic layer by heating and laminating on an arbitrary target, and form a desired pattern by patterned exposure and heat treatment. The methods will be described below.

Example 2

Production of Birefringent Pattern Using Birefringent Pattern Builder Suitable for Transfer Use (Production of Birefringent Pattern BP-1 Using Birefringent Pattern Builder BPM-1)

A non-alkali glass substrate was cleaned using a rotating nylon-haired brush while spraying a glass cleaner solution conditioned to 25° C. by a shower for 20 seconds. After showered with purified water, the substrate was sprayed with a silane coupling solution (0.3% aqueous solution of N-β-(aminoethyl)-γ-aminopropyl trimethoxysilane, trade name: KBM-603, Shin-Etsu Chemical Co., Ltd.) by a shower for 20 seconds, and then cleaned with a shower of purified water to obtain silane-processed glass.

The above-described birefringence pattern builder BPM-1, after being separated from its protective film, was laminated onto silane-processed glass by using a laminator (product of Hitachi Industries Co., Ltd. (model Lamic II)) under a rubber roller temperature of 130° C., a line pressure of 100 N/cm, and a travel speed of 0.6 m/min.

Figure 7:
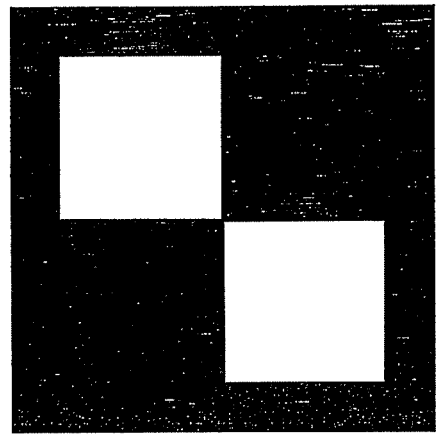
FIG. 7 is a view showing the shape of the photomask I used in Example 2. Herein, the white part is the exposed region, and the black part is the not-exposed region.

After the lamination, the substrate from which the temporary support was peeled was subjected to a patterned light exposure by M-3L exposure apparatus (trade name, made by Mikasa Co., Ltd.) and the photomask I shown in FIG. 7 with an exposure amount of 50 mJ/cm².

Next, the substrate was subjected to a shower development by triethanolamine-based developing solution (containing 2.5% of triethanolamine, nonionic surfactant, and polypropylene-based antifoamer, trade name: T-PD1, manufactured by FUJIFILM Corporation) at 30° C. for 50 seconds with a flat nozzle pressure of 0.04 MPa, to remove the dynamic property control layer and the alignment layer.

Thereafter, the substrate was baked in a clean oven at 230° C. for one hour, to obtain birefringent pattern BP-1. Table 1 shows the retardations of the exposed region and the non-exposed region of BP-1.

TABLE 1

| Sample | Retardation | |
|---|---|---|
| | Non-exposed region | Exposed region |
| BP-1 | 0.5 | 297.5 |

Figure 8:
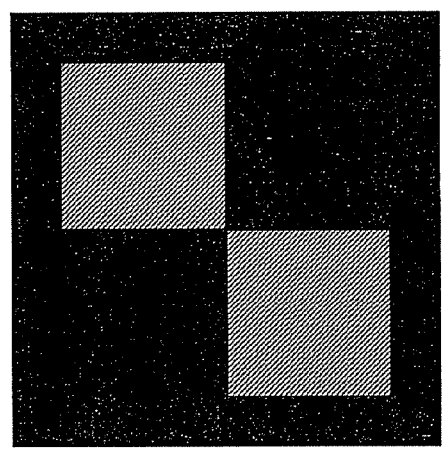
FIG. 8 is a schematic view showing the pattern of the patterned birefringent product produced in Example 2 when it was viewed in a crossed Nicol state.

The pattern of the birefringence pattern BP-1 when viewed in a crossed Nicol state is shown in FIG. 8. In the specification, "in a crossed Nicol state" means a state wherein a sample is arranged between two polarizing plates which are stacked so that the absorption axes of them are about orthogonal to each other. In FIG. 8, the evenly black part is the part observed as black in a crossed Nicol state, and the part marked with diagonal lines is the part observed as yellow in a crossed Nicol state. As shown in FIG. 8, BP-1 showed a clear pattern of yellow and black in a crossed Nicol State.

Example 3

Production of Large-Phase Difference Birefringent Pattern Laminated with Birefringent Pattern Using Birefringent Pattern Builder Suitable for Transfer Use (Production of Large-Phase-Difference Birefringent Pattern BP-2 Using Plural Birefringent Pattern Builders BPM-1)

First, a silane-processed glass was produced in the same manner as in Example 2, and the glass was laminated.

After the lamination, the substrate was subjected to a shower development by triethanolamine-based developing solution (containing 2.5% of triethanolamine, nonionic surfactant and polypropylene-based antifoamer; trade name: T-PD1, manufactured by FUJIFILM Corporation) at 30° C. for 50 seconds with a flat nozzle pressure of 0.04 MPa, to remove the dynamic property control layer and the alignment layer.

The substrate after the development was again laminated with the birefringent pattern builder BPM-1 in the same manner. During this second lamination, attention was paid so that the slow axis of the previously-laminated optically anisotropic layer and the slow axis of the subsequently-laminated optically anisotropic layer were in substantially the same direction.

After the second lamination, the substrate from which the temporary support had been peeled was further subjected to a shower development and lamination in the same manner and was laminated with another birefringent pattern builder BPM-1. During this third lamination, attention was also paid so that the slow axes of the previously-laminated two optically anisotropic layers and the slow axis of the subsequently-laminated optically anisotropic layer were in substantially the same direction.

After the lamination, the substrate from which the temporary support had been peeled was subjected to a patterned light exposure by M-3L exposure apparatus (trade name, made by Mikasa Co., Ltd.) and the photomask I shown in FIG. 7 with an exposure amount of 50 mJ/cm$^2$.

Next, by the same method, the substrate was subjected to a shower development again to remove the dynamic property control layer and the alignment layer.

Thereafter, the substrate was baked in the clean oven at 230° C. for 1 hour, thereby producing the birefringent pattern BP-2. Table 2 shows the retardations of the exposed region and the not-exposed region of BP-2.

TABLE 2

| Sample | Retardation | |
|---|---|---|
| | Non-exposed region | Exposed region |
| BP-2 | 4.2 | 779.2 |

With regard to the sample, the not-exposed region exhibited a very low retardation while the exposed region exhibited a high retardation close to 800 nm.

Figure 9:
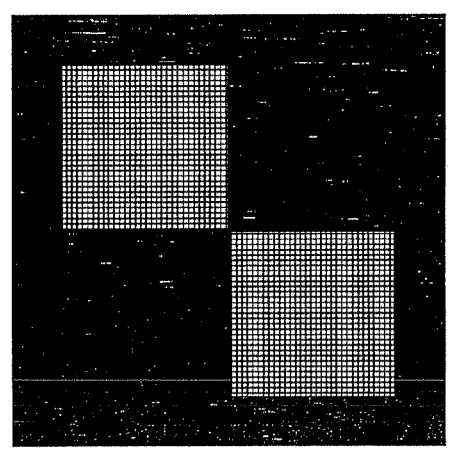
FIG. 9 is a schematic view showing the pattern of the patterned birefringent product produced in Example 3 when it was viewed in a crossed Nicol state.

FIG. 9 shows the pattern observed when this sample was placed in a crossed Nicol state. In FIG. 9, the evenly black part is the part observed as black in a crossed Nicol state, and the lattice part is the part observed as yellow green in a crossed Nicol state. The birefringent pattern builder of the present invention can be laminated in a plurality of layers and thus a pattern having a high retardation value can be obtained easily.

Example 4

Production of Birefringent Pattern Builder Suitable for Direct Use (Preparation of Coating Liquid CL-1 for Transparent Resin Layer)

The composition below was prepared, filtered through a polypropylene filter having a pore size of 0.2 μm, and the filtrate was used as a coating liquid CL-1 for forming a transparent resin layer.

B-4 was a copolymer of benzyl methacrylate and methacrylic acid, having a copolymerization composition ratio (molar ratio) of 72.0/28.0, and a weight-average molecular mass of 38,000.

| Composition of Coating Liquid for Transparent Resin Layer (mass %) | |
|---|---|
| Binder (B-4) | 11.57 |
| NK ester A-BPE-10 (trade name, manufactured by Shin-Nakamura Chemical Co., Ltd.) | 1.30 |
| Radical photopolymerization initiator (RPI-1) | 0.12 |
| Hydroquinone monomethyl ether | 0.002 |
| Megafac F-176PF (trade name, manufactured by Dainippon Ink & Chemicals Incorporation) | 0.05 |
| Methyl ethyl ketone | 86.96 |

(Production of Glass Having Alignment Film)

An aluminum-evaporated glass substrate was cleaned using a rotating nylon-haired brush while spraying a glass cleaner solution conditioned to 25° C. by a shower for 20 seconds. After showered with purified water, the substrate was spin-coated with a coating liquid for producing a polyimide-based alignment film (trade name: SE-410, made by NISSAN CHEMICAL INDUSTRIES, LTD.) at a speed of 5,000 rotations per minute. After heating by a substrate preliminary heating apparatus at 100° C. for 5 minutes, the substrate was subjected to a rubbing treatment in the clean oven at 200° C. for 1 hour to subsequently subject the substrate to a rubbing treatment, thereby obtaining a glass having an alignment film.

(Production of Birefringent Pattern Builder BPM-2 Suitable for Direct Use)

Next, the coating liquid for optically anisotropic layer, LC-1, was applied to the glass having an alignment film using a wire bar coater, dried under heating at 90° C. on the surface of the film for 2 minutes, to thereby obtain a layer of a liquid crystal phase. The coated layer was then illuminated in the air atmosphere by ultraviolet radiation by using a 160 mW/cm$^2$, air-cooled metal halide lamp (product of Eyegraphics Co., Ltd.), so as to fix the alignment state of the phase to thereby obtain a 1.8-μm-thick optically anisotropic layer. The ultraviolet ray used was 100 mW/cm$^2$ illuminance in the range of UV-A (integrated value in the wavelength between 320 nm and 400 nm), and 80 mJ/cm$^2$ irradiation energy in the range of UV-A. Finally, the coating liquid for transparent resin layer, CL-1, was applied to the topsurface of the sample, dried to obtain a transparent resin layer for transfer of 1.2-μm-thick, thereby obtaining a birefringence pattern builder BPM-2.

The produced birefringent pattern builder BPM-2 is a glass sample capable of being stored at an ordinary temperature and pressure. In addition, it could provide a desired birefringent pattern by a patterned light exposure and a heat treatment. The method thereof will be described below.

Example 5

Production of Birefringent Pattern Using Birefringent Pattern Builder BPM-2 Suitable for Direct Use (Production of Birefringent Pattern BP-3 Using Birefringent Pattern Builder BPM-2)

The birefringent pattern builder BPM-2 was subjected to a patterned light exposure by M-3L mask aligner (trade name, made by Mikasa Co., Ltd.) and the photomask I shown in FIG. 7. Thereafter, the birefringent pattern builder BPM-2 was baked in a clean oven at 230° C. for 1 hour to thereby produce the birefringent pattern BP-3.

Figure 10:
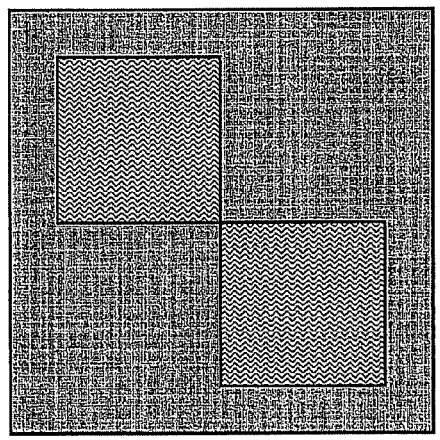
FIG. 10 is a schematic view showing the pattern of the patterned birefringent product produced in Example 5 when it was viewed through a polarizing plate.

FIG. 10 shows the pattern observed when a polarizing plate was superposed on this sample. In FIG. 10, the part shown by gray is a part observed as silver and the part shown with wavy lines is a part observed as bluish purple. As described above, the birefringent pattern can be produced for the observation of reflection. In this case, the pattern can be easily identified only by placing a polarizing plate over the pattern.

Example 6

Production of Product Using Birefringent Pattern as Forgery Prevention Means (Production of Birefringent Pattern Builders BPM-3 and BPM-4)

The birefringent pattern builders BPM-3 and BPM-4 were produced in the same manner as in BPM-1, except that the optically anisotropic layer had a thickness of 2.1 μm and 1.7 μm, respectively.

(Production of Birefringent Pattern BP-4 Having Reflective Layer)

A substrate obtained by temporarily fixing an aluminum foil on a glass by a heat-resistant tape was produced. This substrate was immersed in purified water and was subjected to an ultrasonic cleaning for 2 minutes.

After the protective film of the birefringent pattern builder BPM-4 was peeled, a laminator (trade name: Lamic II-type, made by Hitachi Industries, Ltd.) was used to laminate the cleaned substrate by a rubber roller having a temperature of 130° C., a linear pressure of 100 N/cm, and a transfer rate of 0.6 m/minute.

Figure 11:
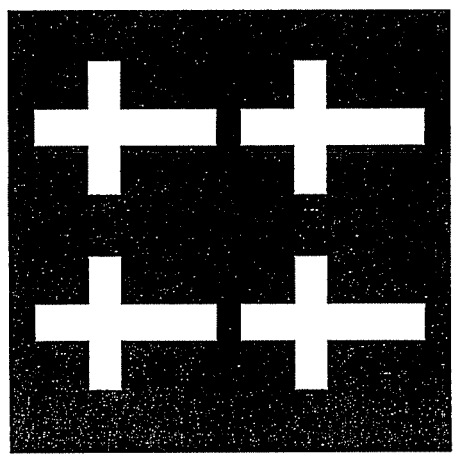
FIG. 11 is a view showing the shape of the photomask II used in Example 6. Herein, the white portion is the exposed region, and the black portion is the non-exposed region.

After the lamination, the substrate from which the temporary support had been peeled was subjected to a patterned light exposure by M-3L mask aligner (trade name, made by Mikasa Co., Ltd.) and the photomask II shown in FIG. 11 with an exposure amount of 50 mJ/cm$^2$.

The substrate after the exposure was laminated with the birefringent pattern builder BPM-3 again in the same manner. During this second lamination, attention was paid so that the slow axis of the previously-laminated optically anisotropic layer and the slow axis of the subsequently-laminated optically anisotropic layer were in substantially the same direction.

Figure 12:
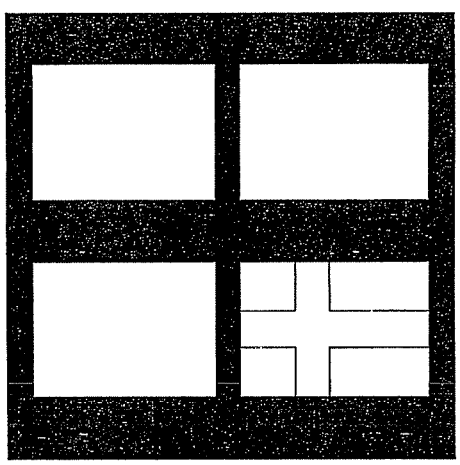
FIG. 12 is a view showing the shape of the photomask III used in Example 6. Herein, the white portion is the exposed region, and the black portion is the non-exposed region.

After the lamination, the substrate from which the temporary support had been peeled was subjected to a patterned light exposure by M-3L mask aligner (trade name, made by Mikasa Co., Ltd.) and the photomask III shown in FIG. 12 with an exposure amount of 50 mJ/cm$^2$. After a 1-hour baking in a clean oven at 230° C. was performed, the aluminum foil laminated with the birefringent pattern was removed from the glass sheet to thereby produce a multi-color birefringent pattern BP-4 on the reflective layer of the present invention.

Figure 13:
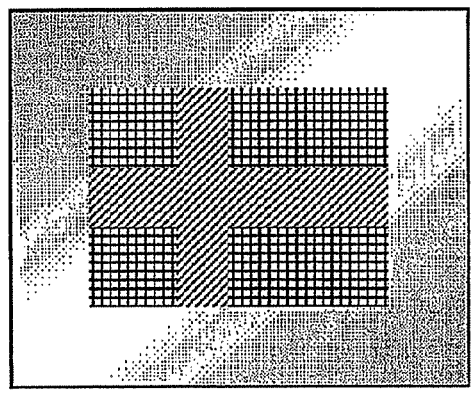
FIG. 13 is an enlarged view showing the pattern of the patterned birefringent product produced in Example 6 when it was viewed through a polarizing plate.

FIG. 13 is an enlarged view showing the pattern on BP-4 observed through a polarizing plate. In FIG. 13, while the base aluminum foil developed silver color, the exposed region exhibited a two-color pattern that the lattice part developed navy color and the part of diagonal lines developed yellow or orange color. The birefringent pattern builder of the present invention can be transferred on an arbitrary base material, and it is possible to easily form a birefringent pattern even on an aluminum foil as shown in this Example.

Figure 14:
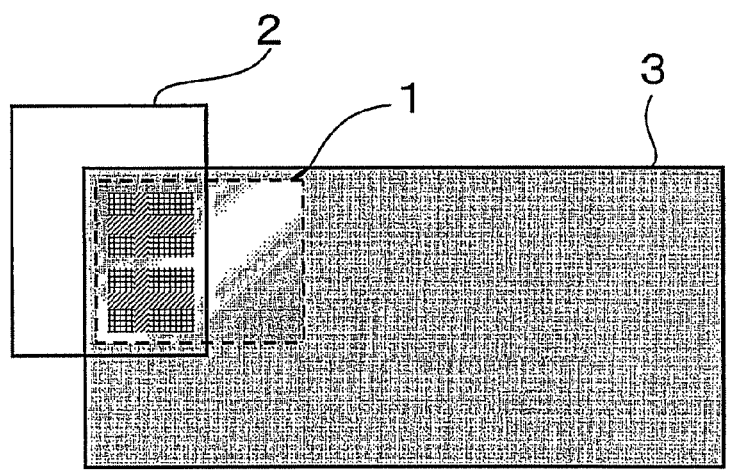
FIG. 14 is a view showing an example where the patterned birefringent product produced in Example 6 is cut to have an appropriate size and is adhered to a gift certificate by adhesive agent.

FIG. 14 shows an example in which the produced birefringent pattern is cut to have an appropriate size and the cut part is adhered on a gift certificate 3 by an adhesive agent. In FIG. 14, a part of an authentication part 1 is a reflection part having thereon the birefringent pattern. The birefringent pattern of the authentication part is generally substantially invisible. However, when the polarizing plate 2 is placed over the birefringent pattern, the birefringent pattern can be visualized as a two-color pattern and thus the authenticity can be determined by the pattern.

Example 7

Preparation of Coating Liquid CU-1 for Dynamic Property Control Layer (Thermoplastic Resin Layer) and Coating Liquid AL-1 for Alignment Layer As shown in Example 1, the coating liquid CU-1 for a dynamic property control layer and the coating liquid AL-1 for an alignment layer were prepared.

(Preparation of Coating Liquid LC-2 for Optically Anisotropic Layer)

The composition below was prepared, filtered through a polypropylene filter having a pore size of 0.2 μm, and the filtrate was used as a coating liquid LC-2 for forming an optically anisotropic layer.

LC-2-1 was synthesized by the method described in JP-A-2004-123882. LC-2-1 is a liquid crystalline compound having two reactive groups, one of which is acrylic group, i.e. a radically reactive group, and the other of which is oxetanyl group, i.e. a cationically reactive group.

| Composition of Coating Liquid for Optically Anisotropic Layer (mass %) | |
|---|---|
| Rod-like liquid crystal (LC-2-1) | 19.57 |
| Horizontal orientation agent (LC-2-2) | 0.01 |
| Cationic photopolymerization initiator (Cyracure UVI6974, trade name, manufactured by Dow Chemical Company) | 0.40 |
| Polymerization control agent (IRGANOX1076, trade name, manufactured by Chiba Speciality Chemicals Co., Ltd.) | 0.02 |
| Methyl ethyl ketone | 80.0 |

Composition of Coating Liquid for Optically Anisotropic Layer (mass %)

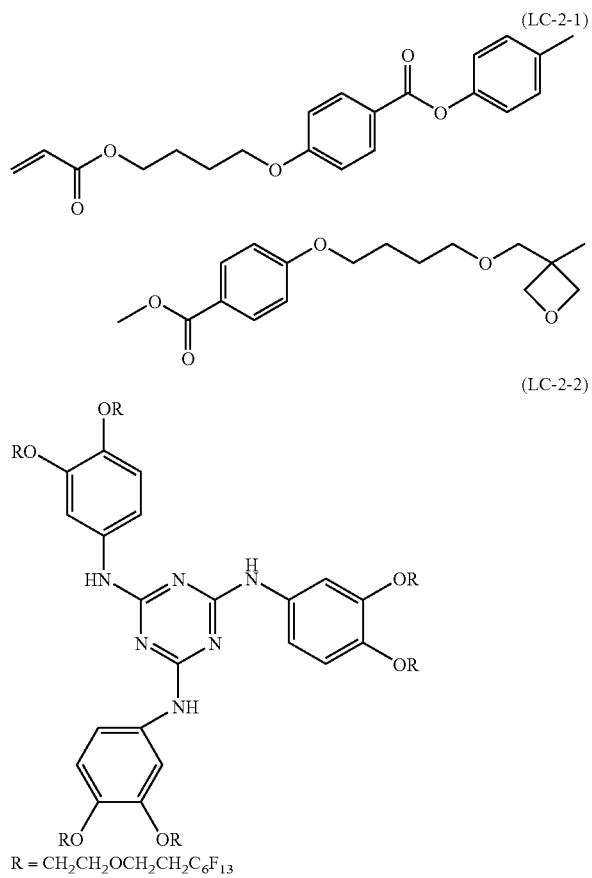

(Transferring Material TR-1 for Producing Birefringence Pattern)

To the surface of a temporary support formed of a 100-μm-thick polyethylene terephthalate film, the coating liquid for a dynamic property control layer, CU-1, and the coating liquid for an alignment layer, AL-1, in this order were applied by using a wire bar coater and dried. The obtained layers had dry film thickness of 14.6 μm and 1.6 μm, respectively. Next, the coating liquid for optically anisotropic layer, LC-2, was applied to the surface using a wire bar coater, dried under heating at a film surface temperature of 105° C. for 2 minutes, to thereby obtain a layer of a liquid crystal phase. The coated layer was then illuminated in the air atmosphere by ultraviolet radiation by using a 160 mW/cm², air-cooled metal halide lamp (product of Eyegraphics Co., Ltd.), so as to fix the alignment state of the phase to thereby obtain a 2.4-μm-thick optically anisotropic layer. In this manner, the ultraviolet ray used was 50 mW/cm² illuminance in the range of UV-B (integrated value in the wavelength between 280 nm and 320 nm), and 35 mJ/cm² irradiation energy in the range of UV-B.

Finally, the coating liquid for adhesive layer for transfer, AD-1, was applied to surface of the formed optically anisotropic layer, dried to obtain an adhesive layer for transfer of 1.0-μm-thick, which was then pressure-bonded with a protective film (a 12-μm-thick polypropylene film), to thereby obtain transferring material TR-1 for producing birefringence pattern.

(Transferring Material TR-6 for Producing Birefringence Pattern)

The transferring material TR-6 for producing a birefringent pattern was produced in the same manner as in TR-1, except that the optically anisotropic layer had a thicknesses of 1.2 μm.

(Production of Birefringent Pattern BP-9 Having Reflective Layer)

A substrate obtained by temporarily fixing an aluminum foil on a glass by a heat-resistant tape was produced. This substrate was heated by a substrate preliminary heating apparatus at 100° C. for 2 minutes.

The above-described transfer material for producing birefringence pattern TR-1, after being separated from its protective film, was laminated onto the substrate preheated at 100° C. for 2 minutes by using a laminator (product of Hitachi Industries Co., Ltd. (model Lamic II)) under a rubber roller temperature of 130° C., a line pressure of 100 N/cm, and a transfer rate of 1.4 m/min.

Figure 15:
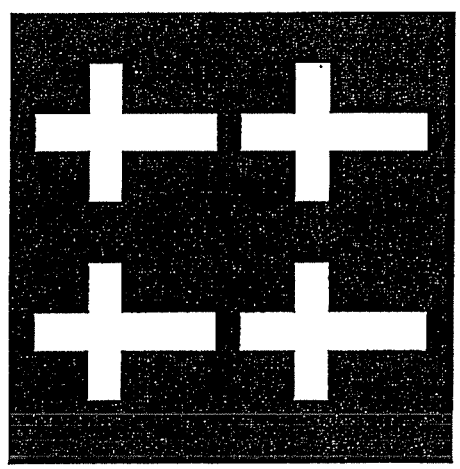
FIG. 15 is a view showing the shape of the photomask IV used in Example 7. Herein, the white portion is the exposed region, and the black portion is the non-exposed region.

After the lamination, the substrate from which the temporary support had been peeled was subjected to a patterned light exposure by M-3L mask aligner (trade name, made by Mikasa Co., Ltd.) and the photomask IV shown in FIG. 15 with an exposure amount of 50 mJ/cm².

The substrate after the exposure was laminated with the transferring material TR-6 for producing a birefringent pattern again in the same manner. During this second lamination, attention was paid so that the slow axis of the previously-laminated optically anisotropic layer and the slow axis of the subsequently-laminated optically anisotropic layer were in substantially the same direction.

Figure 16:
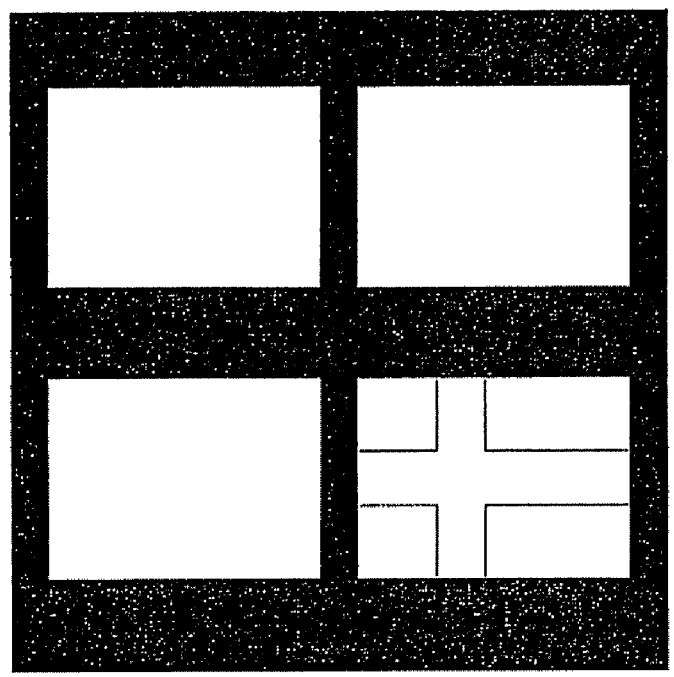
FIG. 16 is a view showing the shape of the photomask V used in Example 7. Herein, the white portion is the exposed region, and the black portion is the non-exposed region.
Figure 17:
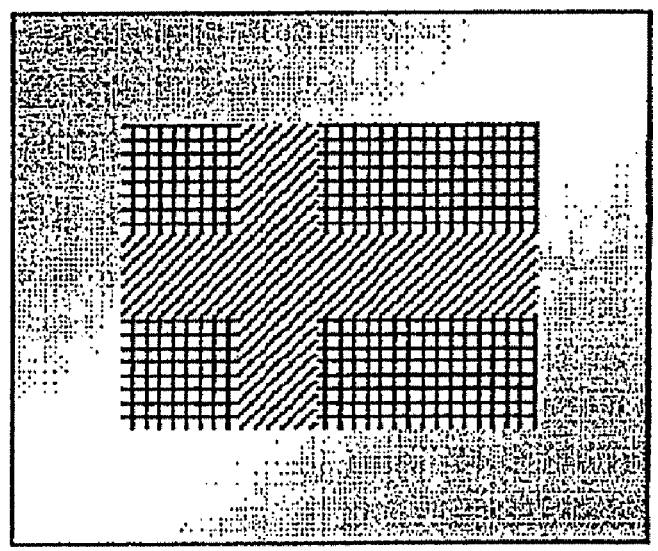
FIG. 17 is an enlarged view showing the pattern of the patterned birefringent product produced in Example 7 when it was viewed through a polarizing plate.

After the lamination, the substrate from which the temporary support had been peeled was subjected to a patterned light exposure by M-3L mask aligner (trade name, made by Mikasa Co., Ltd.) and the photomask V shown in FIG. 16 with an exposure amount of 50 mJ/cm². After a 1-hour baking in a clean oven at 230° C. was performed, the aluminum foil laminated with the birefringent pattern was removed from the glass sheet to thereby produce a multi-color birefringent pattern BP-9 on the reflective layer of the present invention. FIG. 17 is an enlarged view showing the pattern on BP-9 observed through a polarizing plate. In FIG. 17, while the base aluminum foil developed silver color, the exposed region exhibited a two-color pattern that the lattice part developed navy color and the part of diagonal lines developed yellow or orange color.

The aluminum foil side of the birefringent pattern obtained through the above process was coated with two types of adhesive agents having different adhesibilities (COPONYL 5411 (trade name, manufactured by Nippon Synthetic Chemical Industry Co., Ltd.) and COPONYL N-3495HS (trade name, manufactured by Nippon Synthetic Chemical Industry Co., Ltd.)) in a patterned manner. Then, a PET film was provided on the coated surface as a protective film and was stored. The protective film of the produced seal was peeled and the seal was adhered on a pattern paper. When the aluminum foil was pinched and the seal was tried to be peeled, the birefringent pattern layer was partially left on the part coated with the adhesive agent COPONYL 5411 having a higher adhesibility and only the part coated with the adhesive agent COPONYL N-3495HS having a lower adhesibility was peeled, to break the birefringent pattern.

Example 8

The aluminum foil-side of the birefringent pattern obtained in Example 7 was coated with the composition for forming a delamination layer having the following composition so as to partially cover the pattern. Then, the pattern was dried at 110° C. to thereby form a brittle delamination layer.

| Composition for forming Delamination Layer (mass %) | |
|---|---|
| Acrylic resin (PMMA: methyl methacrylate resin) | 25 |
| Toluene | 30 |
| Methyl ethyl ketone | 30 |
| Methyl isobuthyl ketone | 15 |

An adhesive layer of the following composition was coated on the aluminum foil having thereon the delamination layer and was dried at 110° C. to thereby form an adhesive layer.

| Composition for forming Adhesive Layer (mass %) | |
|---|---|
| Acrylic-series adhesive agent (COPONYL NS-004, trade name, manufactured by Nippon Synthetic Chemical Industry Co., Ltd.) | 24 |
| Methyl ethyl ketone | 38 |
| Toluene | 38 |

A PET film was further provided as a protective film on the adhesive layer and was stored.

When the PET film of the produced seal was peeled and the seal was adhered on the pattern paper so that the adhesive layer faces the surface of the pattern paper. When the aluminum foil was pinched to peel the seal, the aluminum foil and the birefringent pattern were left on the no-delamination-layer part and only the delamination-layer-coated part was peeled, to break the birefringent pattern.

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119 (a) on Patent Application No. 2008-132958 filed in Japan on May 21, 2008 and Patent Application No. 2008-157696 filed in Japan on Jun. 17, 2008, which are entirely herein incorporated by reference.

What we claim is:

1. A birefringent pattern builder, comprising:
an optically anisotropic layer containing a polymer having unreacted reactive groups; and
a glass sheet, polyimide, polyether sulfone, heat-resistant polycarbonate, or polyethylene naphthalate as a support, and
a functional layer provided on the optically anisotropic layer, wherein the functional layer contains only one of either a radical polymerization initiator or a cationic polymerization initiator, for starting a polymerization reaction of the unreacted reactive group,
wherein the optically anisotropic layer is produced by the method comprising at least steps [1] and [2] in this order;
[1] coating and drying a solution containing a liquid crystalline compound at least having a radically reactive group and a cationically reactive group, above one side of the support; and
[2] reacting only one of the radically reactive group or the cationically reactive group by applying heat or irradiating ionizing radiation,
wherein the solution containing a liquid crystalline compound contains only one of either a radical polymerization initiator or a cationic polymerization initiator; and
when the polymerization initiator of the optically anisotropic layer is the cationic polymerization initiator, then the polymerization initiator of the functional layer is the radical polymerization initiator, and when the polymerization initiator of the optically anisotropic layer is the radical polymerization initiator, then the polymerization initiator of the functional layer is the cationic polymerization initiator.

2. The birefringent pattern builder according to claim 1, wherein the radically reactive group is an acryl group and/or a methacryl group, and the cationically reactive group is a vinyl ether group, an oxetanyl group, and/or an epoxy group.

3. The birefringent pattern builder according to claim 1, wherein the polymer comprises a unit represented by formula (101) or (102):

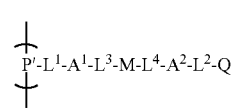

Formula (101)

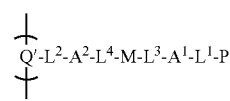

Formula (102)

wherein P represents an unreacted reactive group represented by any one of formulae (3-1) to (3-3):

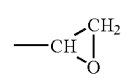

Formula (3-1)

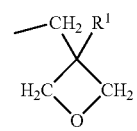

Formula (3-2)

Formula (3-3)

wherein $R^1$ represents an alkyl group having 1 to 4 carbon atoms;

P' represents a partial substructure represented by any one of formulae (4-1) to (4-3):

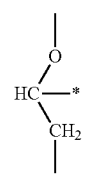

Formula (4-1)

-continued

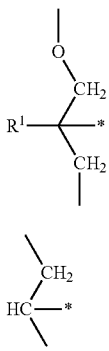

Formula (4-2)

Formula (4-3)

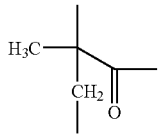

Formula (6-2)

wherein * represents the position at which $L^1$ binds, and wherein $R^1$ represents an alkyl group having 1 to 4 carbon atoms;

Q represents an unreacted reactive group represented by formula (5-1) or (5-2);

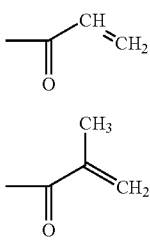

Formula (5-1)

Formula (5-2)

Q' represents a partial substructure represented by formula (6-1) or (6-2);

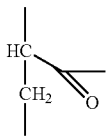

Formula (6-1)

$L^1$, $L^2$, $L^3$, and $L^4$ each independently represent a single bond or a divalent linking group;

$A^1$ and $A^2$ each independently represent a spacer group having 2 to 20 carbon atoms; and M represents a mesogen group.

4. The birefringent pattern builder according to claim 3, wherein $L^1$ is —O—.

5. The birefringent pattern builder according to claim 1, wherein the birefringent pattern builder is used as a transferring material, and wherein the functional layer is an adhesive layer for transfer.

6. A method of producing a patterned birefringent product, comprising at least steps [11] and [12] in this order:

[11] subjecting the birefringent pattern builder according to claim 1 to a heat treatment or irradiation of ionizing radiation in a patterned manner; and

[12] causing the unreacted reactive groups remaining in the optically anisotropic layer to react or deactivate.

7. A method of producing a patterned birefringent product, comprising the steps [31] and [32] in this order:

[31] subjecting the birefringent pattern builder according to claim 1 to a heat treatment or irradiation of ionizing radiation, to react, among the at least two kinds of reactive groups, the reactive group different from one reacted in the step [2]; and

[32] baking the resultant at from 50° C. to 400° C.;

wherein any one of the steps [2] and [31] is performed in a patterned manner.

8. A product made by the method according to claim 6.

* * * * *